US 8,772,671 B2

(12) United States Patent
Broude et al.

(10) Patent No.: US 8,772,671 B2
(45) Date of Patent: Jul. 8, 2014

(54) PRECISION LASER ABLATION

(75) Inventors: Sergey V. Broude, Newton, MA (US); Chen-Hsiung Cheng, Westford, MA (US); Pascal Miller, Groton, MA (US); Glenn Ogura, Oakley, CA (US); David L. Wall, Burlington, MA (US)

(73) Assignee: Resonetics, LLC, Nashua, NH (US)

( * ) Notice: Subject to any disclaimer, the term of this patent is extended or adjusted under 35 U.S.C. 154(b) by 332 days.

(21) Appl. No.: 13/112,575

(22) Filed: May 20, 2011

(65) Prior Publication Data

US 2012/0000893 A1    Jan. 5, 2012

Related U.S. Application Data

(60) Provisional application No. 61/360,045, filed on Jun. 30, 2010, provisional application No. 61/360,060, filed on Jun. 30, 2010.

(51) Int. Cl.
*B23K 26/06* (2014.01)
*B23K 26/36* (2014.01)
*B23K 26/03* (2006.01)
*B23K 26/40* (2014.01)

(52) U.S. Cl.
CPC ........... *B23K 26/365* (2013.01); *B23K 2201/34* (2013.01); *B23K 26/407* (2013.01); *B23K 26/063* (2013.01); *B23K 26/032* (2013.01); *B23K 2203/00* (2013.01); *B23K 26/409* (2013.01)
USPC ............. 219/121.69; 219/121.62; 219/121.83

(58) Field of Classification Search
USPC ............. 219/121.68, 121.69, 121.83, 121.62; 356/317, 318
See application file for complete search history.

(56) References Cited

U.S. PATENT DOCUMENTS

| 4,626,652 A | 12/1986 | Bjork et al. | |
| 5,011,626 A * | 4/1991 | Ma et al. | 252/582 |
| 5,204,517 A * | 4/1993 | Cates et al. | 219/121.62 |
| 5,281,798 A * | 1/1994 | Hamm et al. | 219/121.62 |

(Continued)

FOREIGN PATENT DOCUMENTS

| DE | 102004042155 A1 * | 3/2006 |
| EP | 544398 A1 * | 6/1993 |
| WO | WO-02/29853 A2 * | 4/2002 |

OTHER PUBLICATIONS

Sun et al., "Micromachining of vias through thermal-sprayed multilayer structures using ultrafast lasers", Nov. 2001, Proceedings of 2001 ASME International Mechanical Engineering Congresses and Exposition, New York, NY, pp. 1-7.*

(Continued)

*Primary Examiner* — Geoffrey S Evans
(74) *Attorney, Agent, or Firm* — Mintz, Levin, Cohn, Ferris, Glovsky and Popeo, P.C.

(57) ABSTRACT

Methods and systems for precisely removing selected layers of materials from a multi-layer work piece using laser ablation are disclosed. Precise removal of one or more selected layers of materials of a work piece may be performed by irradiating at least one location on a multi-layer work piece with a laser beam, ablating material at the at least one location, detecting one or more characteristics of the material ablated at the at least one location and analyzing the one or more characteristics to identify a change in at least one of the one or more characteristics that indicates a change in the type of material being ablated. Related systems are also described.

20 Claims, 17 Drawing Sheets

(56) References Cited

U.S. PATENT DOCUMENTS

| | | | |
|---|---|---|---|
| 5,386,430 A | 1/1995 | Yamagishi et al. | |
| 2001/0020548 A1* | 9/2001 | Burgess | 174/262 |
| 2003/0071020 A1 | 4/2003 | Hong et al. | |
| 2004/0153117 A1* | 8/2004 | Clubb et al. | 606/200 |
| 2007/0000885 A1* | 1/2007 | Thomas et al. | 219/121.69 |
| 2007/0017908 A1 | 1/2007 | Sercel et al. | |
| 2007/0038196 A1* | 2/2007 | Karlsson et al. | 604/368 |
| 2007/0296967 A1* | 12/2007 | Gupta et al. | 356/318 |
| 2009/0091745 A1* | 4/2009 | Levesque et al. | 356/73 |
| 2011/0017715 A1* | 1/2011 | Marcus et al. | 219/121.71 |
| 2011/0100967 A1* | 5/2011 | Yoo et al. | 219/121.73 |
| 2011/0284510 A1* | 11/2011 | Reeves-Hall et al. | 219/121.72 |
| 2012/0206722 A1* | 8/2012 | Grigoropoulos et al. | 356/318 |

OTHER PUBLICATIONS

Tong et al, Real-time control of ultrafast laser micromachining by laser-induced breakdown spectroscopy, Mar. 2004, Applied Physics, vol. 43, No. 9, pp. 1971-1980.*

Das et al.,"Depth-profiling study of a thermal barrier coated superalloy using femtosecond laser-induced breakdown spectroscopy", published on-line Nov. 2007 Spectochimica Acta A Part B, vol. 63, pp. 23-36.*

International Search Report and The Written Opinion of the International Searching Authority, or the Declaration for International Application No. PCT/US2011/037349 date of completion of the international search Jan. 19, 2012.

* cited by examiner

PRECISION LASER ABLATION

CROSS-REFERENCE TO RELATED APPLICATIONS

The present application claims priority to U.S. Provisional Patent Application Nos. 61/360,045, filed on Jun. 30, 2010 and entitled "Fine Control of Laser Ablation in Laser Micromachining" and 61/360,060, filed on Jun. 30, 2010 and entitled "Layer Asymmetry Compensation in Precision Laser Ablation," the disclosure of which are incorporated herein by reference in their entirety.

FIELD

The subject matter described herein relates to removal of material from a work piece using laser ablation.

BACKGROUND

Ablation is the removal of material from the surface of an object by vaporization, chipping or other erosive processes. The term "ablation" is often used in the context of laser ablation, a process by which laser beam energy is applied to the surface of a solid or liquid material. At least some of this energy is absorbed by the material, which can lead to several mechanisms of material removal, including: melting with further expulsion due to shock or to high-pressure assist gas, sublimation of the material directly into gas phase due to very fast heating, photo-chemical bond breaking resulting in the release of solid, liquid or gaseous fragments, or a combination of any of the foregoing. The type of ablation of a given material depends on the material's properties (e.g., density, absorption spectrum, thermal conductivity and diffusivity and/or specific heat) and the laser's characteristics (e.g., wavelength, pulse energy, pulse rate, pulse duration and/or beam fluence on target).

For a given ablation application, an important characteristic is the beam fluence on target (i.e., the energy density per unit area, usually measured in $J/cm^2$). As the beam penetrates the material, its fluence is attenuated generally exponentially at the rate determined by the material's absorption coefficient at the laser's wavelength. For a given material, the ablation rate is defined as a thickness of a layer of a material which is removed by one pulse. In general, ablation occurs only when the beam fluence exceeds an ablation threshold ($F_{th}$). If the beam fluence is below the threshold, only heating of the material occurs without ablation. If the beam fluence is above the threshold, in general, the thickness of the material ablated, and thus the ablation rate, is determined by how far into the material the beam penetrates while still having beam fluence above $F_{th}$. Thus, ablation rate increases with fluence, and ranges typically, from ~10 nm to ~10 µm per pulse. Generally, pulses contribute cumulatively to ablation, i.e., the amount of ablated material (e.g., the depth in cases of drilling) is proportional to the number of pulses. In some situations, there are variations which may depend upon, for example, pulse rate or the shape and size of the channel being ablated. However, typically the more pulses applied, the more material that will be ablated.

The physics described above and the development of laser technology has resulted in wide use of laser ablation for advanced fabrication methods. Lasers are used for controlled removal of materials on different size scales, especially for micromachining down to sub-microns. Both direct-write and mask-projection techniques may be used, and laser beam wavelengths may be selected based on the materials being processed.

Laser ablation may be used to remove one or more layers of material from work pieces of various shapes and sizes. For example, laser ablation may be used to strip a layer of material of uniform thickness from the circumference of a substantially cylindrical work piece, such as a wire, catheter, tube or needle, by either rotating the work piece while exposing it to a stationary laser beam, keeping the work piece stationary and exposing it to multiple laser beams or some combination of both. Laser ablation may also be used to remove a uniform outer layer from a non-cylindrical work piece by either moving the work piece relative to a stationary laser beam, moving a laser beam relative to the work piece or a combination of both (e.g., the work piece may be scanned in one direction by moving the work piece and scanned in another direction by moving a laser beam).

When a layer of material has a substantially uniform and known thickness, and an ablation rate is known or can be determined, a laser ablation process may be pre-configured to remove only that layer of material. The ablation depth of the laser beam may be pre-configured by selecting appropriate parameters, such as wavelength, pulse number and fluence. However, when the thickness of the material is non-uniform and/or unknown, a pre-configured laser beam would ablate the same thickness of material along the entire work piece, leaving either uneven amounts of material on the work piece and/or cutting into one or more underlying layers of material on the work piece.

When the thickness of a layer of material is non-uniform and/or unknown, but it is known that the ablation threshold of a first layer, $F_{th}^{first}$, is sufficiently lower than that of an adjacent underlying second layer, $F_{th}^{second}$, a substantially complete removal of the first layer can be achieved by employing a beam having a fluence value, $F_{beam}$, that is in between the ablation threshold values of the first and second layers, i.e., high enough to ablate the first layer and but too low to affect the second layer, or $F_{th}^{first} < F_{beam} < F_{th}^{second}$. However, this favorable condition is not always available.

One of the challenges of laser ablation is therefore precisely removing one or more selected layers of material from a multi-layer work piece without ablating, damaging or otherwise altering other layers in the work piece. This challenge becomes particularly acute when attempting to remove a first layer of material from a second layer of material when the thickness of the first layer is non-uniform/asymmetrical and/or unknown and the ablation threshold values are not sufficiently different.

SUMMARY

Embodiments of the present disclosure provide methods and systems directed to selectively and precisely removing one or more layers of material from a multi-layer work piece using laser ablation without substantially ablating, damaging or otherwise altering other layers of material in the multi-layer work piece. The term "work piece" as used herein may include without limitation mechanical parts for medical devices, semiconductor components, circuitry and a wide variety of industrial components.

Embodiments disclosed herein may be directed to methods of laser ablation that irradiate at least one location of a multi-layer work piece with a laser beam, ablate material at the at least one location, detect one or more characteristics of the material being ablated at the at least one location and analyze the one or more characteristics to identify a change in at least one of the one or more characteristics that indicates a change in type of material being ablated. In some embodiments, the one or more characteristics may be related to optical signatures, ablation plume emissions, fluorescence, acoustic signatures and/or morphology. Method embodiments may terminate the irradiating upon identifying the change in at least one of the one or more characteristics and/or change the at least one location in response to identifying the change in at least one of the one or more characteristics. The work piece may be cylindrical and, in some embodiments, include a layer of first material with a thickness that is asymmetrical and unknown. The work piece may be non-cylindrical and, in some embodiments, include a layer of first material with a thickness that is non-uniform and unknown.

Some method embodiments may involve ablation plume emissions being emanated from the material being ablated at the at least one location. The ablation plume emissions may be detected and analyzed to determine a spectral composition that is characteristic of the material. According to some embodiments, the irradiating may be terminated upon determining that the spectral composition is no longer characteristic of the material. Some method embodiments may involve fluorescent emissions being emanated from the material being ablated at the at least one location. The fluorescent emissions may be detected and analyzed to determine a spectral composition that is characteristic of the material. According to some embodiments, the irradiating may be terminated upon determining that the spectral composition is no longer characteristic of the material.

Some method embodiments may involve light being emanated from the material being ablated at the at least one location. The light may be detected and analyzed to determine an optical signature that is characteristic of the material. According to some embodiments, the irradiating may be terminated upon determining that the optical signature is no longer characteristic of the material. In some embodiments, the light may correspond to reflected light of an illumination source impinging upon the material during the irradiating.

Some method embodiments may involve acoustic excitations being emanated from the material being ablated at the at least one location. The acoustic excitations may be detected and analyzed to determine an acoustic signature that is characteristic of the material. In some embodiments, the irradiating may be terminated upon determining that the acoustic signature is no longer characteristic of the material.

Some method embodiments may involve observing the morphology of the material being ablated at the at least one location to identify a morphology that is characteristic of the material. In some embodiments, the irradiating may be terminated upon identifying that the morphology is no longer characteristic of the material.

Embodiments of the present disclosure may also be directed to laser ablation systems. Systems may include a laser light-emitting device for irradiating at least one location on a multi-layer work piece with a laser beam, a detector configured for generating at least one signal relating to one or more characteristics of the ablating of material of the multi-layer work piece at the at least one location and a processor having instructions operable thereon and configured to at least one of operate and control at least the laser light-emitting device. In some embodiments, the instructions may be additionally configured to enable the processor to analyze the at least one signal relating to the one or more characteristics of the material being ablated at the at least one location and determine a change in at least one of the one or more characteristics that indicates a change in the type of material being ablated. In some embodiments, the one or more characteristics may relate to optical signatures, ablation plume emissions, fluorescence, acoustic signatures and/or morphology. In some embodiments, the instructions may be further configured to enable the processor to terminate irradiating upon determining the change in at least one of the one or more characteristics and/or change the at least one location in response to determining the change in at least one of the one or more characteristics. In some systems, the detector may be a camera, a light sensor, an acoustic sensor, a spectrometer, and any combination thereof.

System embodiments may involve the detector generating at least one signal relating to ablation plume emissions emanated from the material being ablated at the at least one location. In some embodiments, the analysis of the at least one signal may determine a spectral composition that is characteristic of the material. According to some embodiments, the instructions may be further configured to enable the processor to terminate irradiating upon determining that the spectral composition is no longer characteristic of the material. Some system embodiments may involve the detector generating the at least one signal relating to fluorescent emissions emanated from the material being ablated at the at least one location. In some embodiments, the analysis of the at least one signal may determine a spectral composition that is characteristic of the material. According to some embodiments, the instructions may be further configured to enable the processor to stop irradiating upon detecting that the spectral composition is no longer characteristic of the material. Some embodiments may involve the detector generating the at least one signal relating to light emanated from the material being ablated at the at least one location. In some embodiments, the analysis of the at least one signal may determine an optical signature that is characteristic of the material. According to some embodiments, the instructions may be further configured to enable the processor to stop the irradiation upon detecting that the optical signature is no longer characteristic of the material.

System embodiments may also involve the detector generating the at least one signal relating to the acoustic excitations emanated from the material being ablated at the at least one location. In some embodiments, the analysis of the at least one signal may determine an acoustic signature that is characteristic of the material. According to some embodiments, the instructions may be further configured to enable the processor to stop irradiating upon detecting that the acoustic signature is no longer characteristic of the material.

Some system embodiments may involve the detector generating the at least one signal corresponding to graphical data relating to the surface of the material being ablated at the at least one location. In some embodiments, the analysis of the at least one signal may determine a morphology that is characteristic of the material. According to some embodiments, the instructions may be further configured to enable the processor to stop irradiating upon detecting that the morphology is no longer characteristic of the material.

Some embodiments may be directed to a laser ablation method that includes determining the thickness of a layer of first material of a multi-layer work piece to create a thickness profile of the layer of first material. Some method embodiments may also include delivering a predetermined number of laser beam pulses to various locations on the layer of first material. In some embodiments, the number of laser beam pulses delivered to a particular location on the layer of first material may depend on the thickness of the layer of first material at that particular location. Determining the thickness of the layer of first material may also include capturing an image of the multi-layer work piece and deriving the thickness of the layer of first material based on the captured image and prior knowledge of the thickness of a layer of second material adjacent to the layer of first material. In some embodiments, the work piece may be cylindrical and the thickness of the layer of first material may be asymmetrical and unknown. In other embodiments, the work piece may be non-cylindrical and the thickness of the layer of first material may be non-uniform and unknown. In some method embodiments, determining the thickness of the layer of first material may involve rotating the work piece about its longitudinal axis, monitoring the dynamic disbalance of the work piece during the rotation and/or deducing the asymmetry of the layer of first material based on the dynamic disbalance.

The details of one or more variations of the subject matter described herein are set forth in the accompanying drawings and the description below. Other features and advantages of the subject matter described herein will be apparent from the description and drawings and from the claims.

BRIEF DESCRIPTION OF THE FIGURES

The accompanying drawings, which are incorporated in and constitute a part of this specification, show certain aspects of the subject matter disclosed herein and, together with the description, help explain some of the principles associated with the disclosed embodiments. In the drawings.

Like reference symbols in the various drawings indicate like elements.

DETAILED DESCRIPTION

The present disclosure describes various methods and systems for precisely removing at least substantially all of one or more layers of material from a multi-layer work piece. These methods and systems may be advantageous when a layer of material selected for removal from a work piece (i) has a thickness that is unknown and/or non-uniform or asymmetrical; and/or (ii) has an ablation threshold value that is not sufficiently different from the ablation threshold value of one or more layers of the material adjacent to that layer of material. Using one or another of the disclosed methods and systems may provide for precise removal of one or more selected layers of material without substantially ablating, damaging and/or otherwise altering other portions of the work piece that are not to be removed. A multi-layer work piece contemplated for use with some of the embodiments of the present disclosure may be cylindrical, or in some embodiments, non-cylindrical. When discussing cylindrical, multi-layer work pieces herein, the terms "symmetrical" and "asymmetrical" will be used in referring to the thickness of the layers of such work pieces. When discussing non-cylindrical, multi-layer work pieces herein, the terms "uniform" and "non-uniform" will be used in referring to the thickness of the layers of such work pieces.

Some of the method and system embodiments of the present disclosure can, with substantial precision, remove one or more layers of material from a multi-layer work piece by, for example, detecting the end-point of the laser ablation process with respect to a specific layer of material on the work piece. "End-point detection" refers to determining when, during the ablation of a layer of material, the layer has been substantially removed from the work piece at the point of impact of the laser beam upon that layer. In some embodiments, end-point detection methods and systems can collect, measure, process, and/or otherwise analyze optical, spectral and/or acoustic characteristics exhibited by a layer of material being irradiated and/or illuminated by a illumination source and/or energy source during a laser ablation process. These characteristics include at least one of: optical characteristics, spectral composition, and acoustic signatures. By collecting, measuring, processing, and/or otherwise analyzing one or more of these characteristics, the end-point of an ablation process may be determined.

Figure 1:
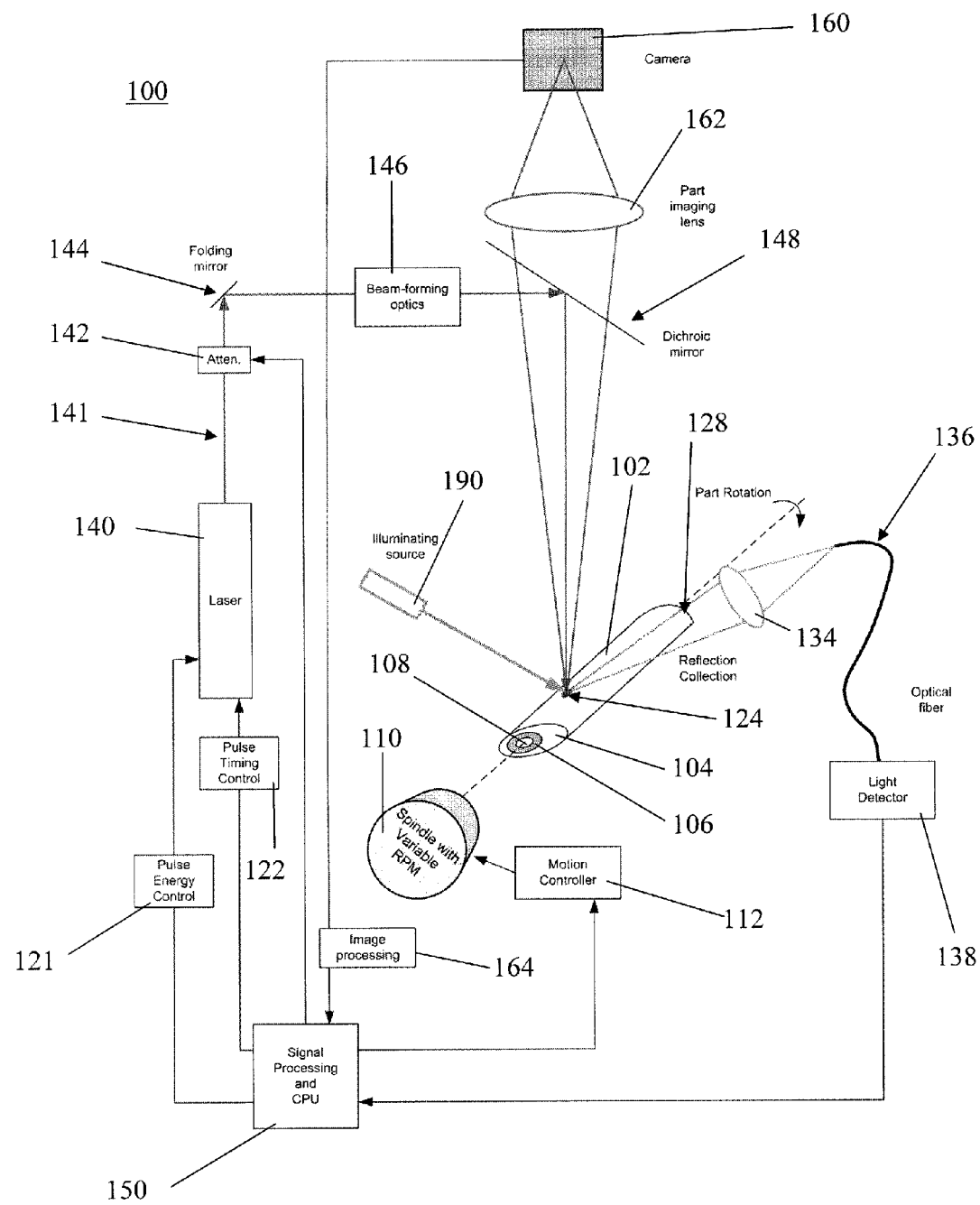
FIG. 1 shows an embodiment of a system for removing one or more layers of material from a multi-layer work piece using end-point detection based on optical signatures according to the present disclosure

Optical Signature End-Point Detection. In some embodiments of the present disclosure, method and system embodiments are provided that detect the end-point of the ablation of a layer of material by collecting, measuring, processing, and/or otherwise analyzing one or more optical characteristics of the light received from that layer of material. The term "optical signature" as used herein refers to the optical characteristics that are representative of a particular layer of material of a work piece. For example, as illustrated in FIG. 1, a system (100) is provided for detecting the end-point of the ablation of a layer of first material (104) (e.g., a polymer-metal coating) and/or a layer of second material (106) (e.g., a polymer-only coating) of a multi-layer work piece (102). The work piece (102) may be any shape or size. FIG. 1, for purposes of illustration and description only, shows the work piece (102) as cylindrical (e.g., a multi-layer wire) with the layer of first material (104) being asymmetrical and the layer of second material (106) being substantially symmetrical. In other embodiments, the layer of first material (104) may be symmetrical and/or the layer of second material (106) may be asymmetrical. The work piece (102) may also have a core (108) (e.g., a metal wire) upon which the layer of second material (106) is positioned. The work piece (102) may be attached to a spindle (110) that, in conjunction with a motion controller (112), rotates the work piece at a fixed and/or variable speed. The system (100) may include an illuminating source (190) for illuminating the work piece (102). The system (100) may also include a laser (140) that emits a laser beam (141) that may propagate through various components, including attenuator (142), folding mirror (144), beam-forming optics (146) and/or dichroic mirror (148) to be irradiated upon the work piece (102) at a point of impact (124), as shown in FIG. 1. In some embodiments, system (100) may also include a camera (160), an imaging lens (162) and an image processor (164). System (100) may further include a reflection collection lens (134) for collecting reflection light from work piece (102), as well as an optical fiber (136) and a light detector (138). The motion controller (112), image processor (164) and light detector (138) may be in communication with a central processing unit ("CPU") (150) (e.g., a computer). The CPU (150) may process image data from camera (160) and reflection signals from light collection lens (134) to measure, process, and/or otherwise analyze optical characteristics of light arriving from the work piece (102). The CPU (150) may also be coupled to a pulse energy control (121) and a pulse timing control (122) to control the frequency and energy level of laser beam pulses irradiated upon the work piece (102) in view of image data received from camera (160) and/or reflection signals received from collection lens (134).

Optical characteristics useful for end-point detection may include, for example, interference, polarization, polarization retardation (i.e., phase shift), refraction, reflection, scattering and other effects that may occur when light from illuminating source (190) impinges on the work piece (102). In contrast to spectral emission techniques described herein, the end-point detection methodologies of the present disclosure that utilize optical characteristics do not involve detecting differences between the wavelength(s) of an incoming ablating laser beam and the wavelengths of outgoing light emissions. Rather, optical end-point detection methods of the present disclosure contemplate collecting, measuring, processing, and/or otherwise analyzing that portion of the light from illuminating source (190) that is not absorbed by the work piece (102) but, instead, is re-directed as outgoing light at wavelengths substantially the same as the wavelengths of the illuminating source (190).

In some embodiments, interference characteristics of light re-directed from work piece (102) may be used to precisely determine the thickness of thin and/or transparent materials before or after laser ablation. In some embodiments, the retardation, or phase shift, of light will change the polarization state of the light when it passes through one or more layers of material of the work piece (102). Because the amount of retardation depends on the chemical and/or geometric characteristics of the work piece, applicants have discovered that it may also be used to determine the end-point of ablation of the layer of first material (104) or layer of second material (106). In some embodiments, refraction characteristics may cause light re-directed from the work piece (102) to change its angle of propagation at the interface of the layer of first material (104) and the layer of second material (106) when both layers are transparent. If layer of material is totally removed, the propagation of light will inevitably change due to the loss of the interface. This effect of refraction change can be used to detect the end-point of ablation of that layer.

In some embodiments of the present disclosure, methods, systems and devices are provided that collect, measure, process, and/or otherwise analyze the strength, or intensity, of the reflection signals emitted from the layer of first material (104) or layer of second material (106) of the work piece (102) to detect the end-point of the ablation of those layers. In some embodiments, the colors of the layers of the work piece (102) may be utilized to detect the ablation end-point of one or more of those layers. For example, the layer of first material (104) may be "red" and the layer of second material (106) may be "blue." During ablation of the layer of first material (104), that layer may be illuminated with illumination source (190), wherein illumination source (190) is separate from the ablating laser beam (141). The light detector (138) may be programmed, or otherwise calibrated, to detector wavelengths in the "red" wavelength spectrum. During the ablation process, the collection lens (134) collects reflected light (128) and transmits it to light detector (138). The light detector (138), in conjunction with CPU (150) according to some embodiments, may then measure, process, and/or otherwise analyze the light (128) and produce a corresponding signal to determine that high intensities of reflection in the "red" wavelength spectrum (e.g., 700 nm) are present. As ablation of the layer of first material (104) continues, the light detector (138) will detect decreasing levels of reflection signal intensities in the "red" wavelength spectrum because the "blue" layer of second material (106) will become exposed. The end-point of ablation of the "red" layer of first material (104) will be marked by the light detector (138) no longer detecting any reflection signals having intensities in the "red" wavelength spectrum. Upon the CPU (150) analyzing the intensities of the reflection signals and determining that there are no longer intensities in the "red" wavelength spectrum, the CPU (150) may terminate the ablation process by stopping the laser (140) via the pulse energy controller (121) and/or reconfiguring the laser (140) and accompanying components (142, 144, 146 and/148) to irradiate the work piece (102) at a different point of impact (124).

In some embodiments, the absolute strength of one or more reflection signals (128) may be used for end-point detection. In other embodiments, the progression of a reflection signal (128) during ablation, i.e. the change in the reflection signal (128) as ablating pulses are applied, may be measured and used as an indication of material removal and surface characteristics. At a given point of impact (124) on the layer of first material (104) or layer of second material (106) of the work piece (102), the strength or intensity of a reflection signal (128) may change from 10V to 9V from one laser beam (141) pulse to the next, while at a different point of impact (124) on either layer, the strength of a reflection signal (128) may only change from 5V to 4.5V, even though both ablations removed the same amount of material at both points of impact (124).

Figure 2:
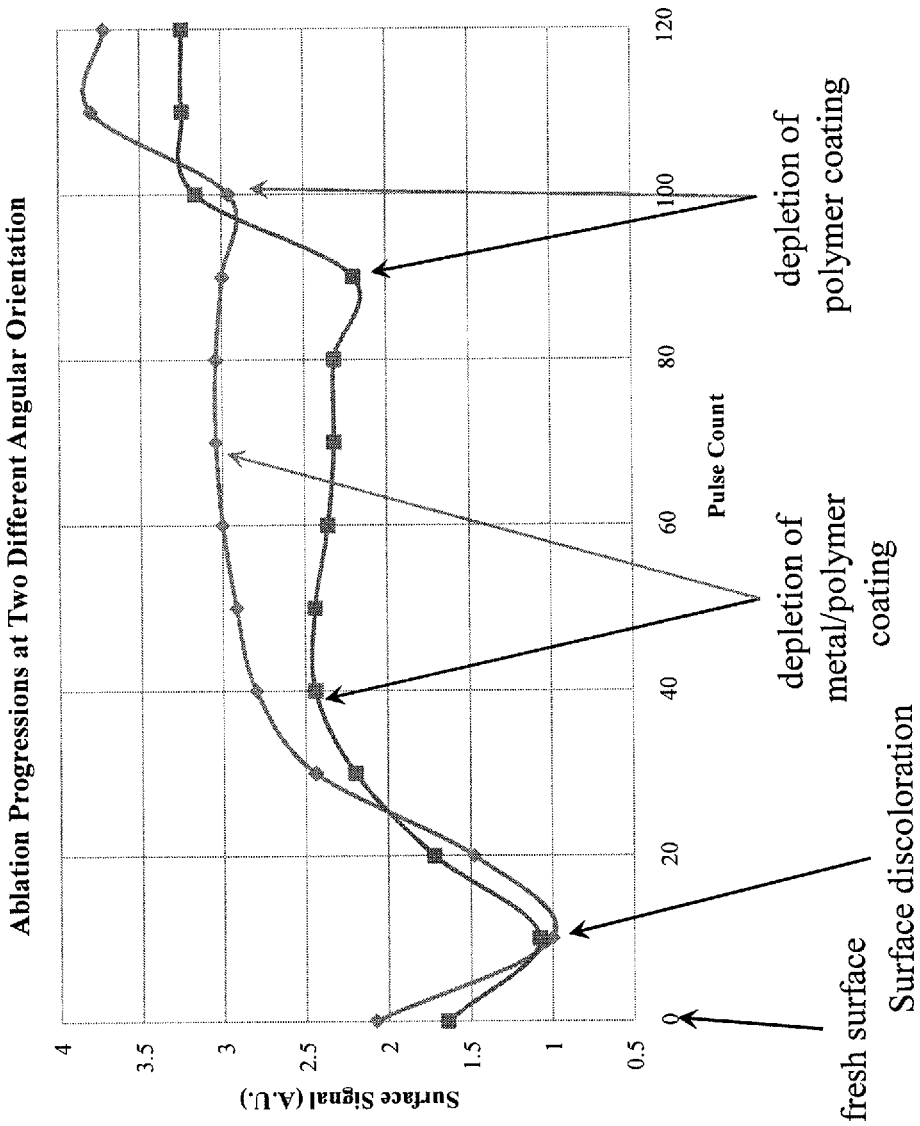
FIG. 2 shows sample data relating the progression of reflectivity measurements during ablation according to some embodiments of the present disclosure.

FIG. 2 shows a progression of reflectivity measurements during ablation for a cylindrical work piece (e.g., a wire) taken at two distinct angular orientations of the work piece as the work piece is rotated. When an outer layer (e.g., a metal-polymer coating) is ablated, the reflection signal may exhibit less than a 3% change in reflection signal strength or intensity. At a first angular orientation (square symbols in plot in FIG. 2) depletion of the outer layer may occur at approximately a 40-pulse exposure and at a second angular orientation, (diamonds in FIG. 2), depletion of the outer layer may occur at a 70-pulse exposure. Also, when a second layer (e.g., a polymer coating), is depleted, the strength or intensity of the reflection signal may exhibit a sudden fractional change from a slow decline to a fast increase, as it is shown at 90 pulses at the first angular orientation (square symbols) and at 100 pulses at the second angular orientation (diamonds).

In some embodiments, steps may be taken to minimize variations in the reflection signals by, for example, using a laser beam that is collimated and large relative to the potential position variation. To optimize reflection signal collection, the illumination source, collection lens and the longitudinal axis of the work piece may be positioned in the same plane. In some embodiments, optimal angular resolution may be achieved when the longitudinal axis of the work piece is perpendicular to the plane that contains the illumination source and the collection lens. Otherwise, many of the extraneous reflected signals would be captured by the collection lens and accurate collection of reflection signals will suffer. The illumination source may also be scattered by the work piece. The strength of a scattered illumination source may depend on the surface characteristics of the material being illuminated. In some embodiments, scattered signals may be used to detect an ablation end-point; however, these signals are often weaker and require spatial-filtering to separate the scattered signals from the reflection signals.

Figure 3:
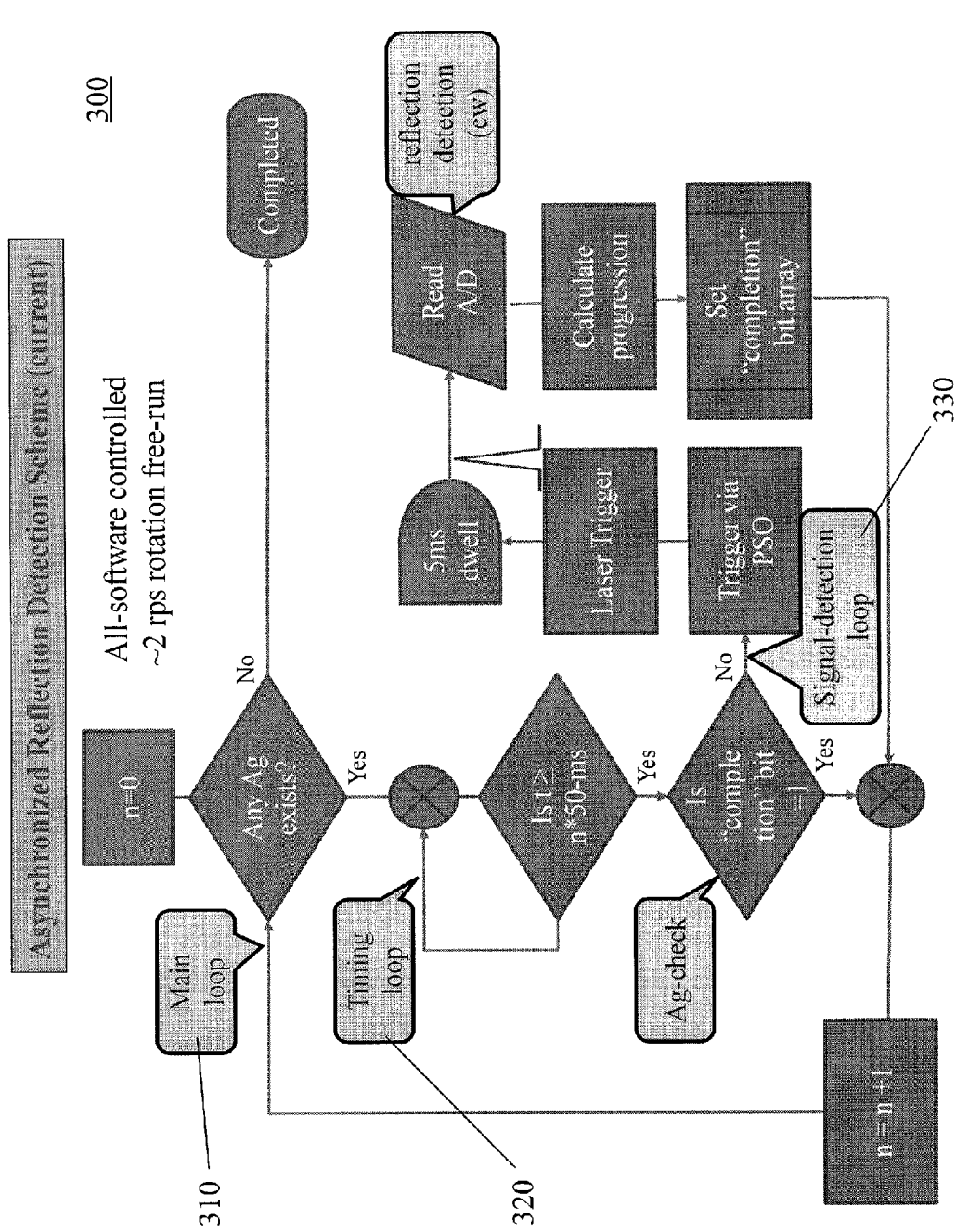
FIG. 3 shows a flow diagram of an asynchronous reflection detection scheme according to some embodiments of the present disclosure.

The collection and processing of data relating to reflectivity using the illumination source (190) within system (100) may be performed, at least in part and at least with respect to some embodiments, by one or more software programs running on the CPU (150). Such programs may include a plurality of nested loops. FIG. 3 shows an exemplary protocol (300) for asynchronous reflected light (128) detection of according to some embodiments of the present disclosure. The protocol (300) may have a main loop (310) that executes, for example, about every 50 milliseconds ("ms"), or other designated amount. The protocol (300) may also include a timing loop (320) to compare a time stamp against, for example, an integer multiplier of the 50 ms example, wherein the protocol (300) may progress to a signal detection loop (330) only after an additional 50 ms example has lapsed since the timing loop (320) was last executed. The signal detection loop (330) may direct the protocol (300) to return to the beginning of the main loop (310) if the current location being ablated on the layer of first material (104) or layer of second material (106) was previously marked "first material-free" (or substantially "first material-free", "first material free" corresponding to both situations, all throughout the entire disclosure) For example, as shown in FIG. 3, if the first material is silver (Ag), the point of impact (124) may be marked "first material-free" (e.g., "Ag-free") when the strength of the reflection signals is within a pre-set acceptable uncertainty (e.g., 3%). Otherwise, the protocol (300) would execute the signal detection loop (330) to detect, process and analyze the reflected light (128).

The signal detection loop (330) may trigger the illumination source (190) to illuminate the work piece (102) and detect reflected light (128) via the collection lens (134), optical fiber (136) and light detector (138). In some embodiments, when the strength of the detected reflection signals is lower than a pre-set value (e.g., 3 mV), the point of impact (124) may be marked "first material-free" (e.g., "Ag-free") and the laser beam will not fire again at this location. When the protocol (300) loops back to the beginning of the main loop (310), the number of, for example, "Ag-free" locations will be checked. If/when all locations are "Ag-free," (or substantially "Ag-free", "Ag-free" hereinafter meant to cover both situations, all throughout the entire disclosure), protocol (300) may stop and removal of the layer of first material will be deemed complete.

Figure 4:
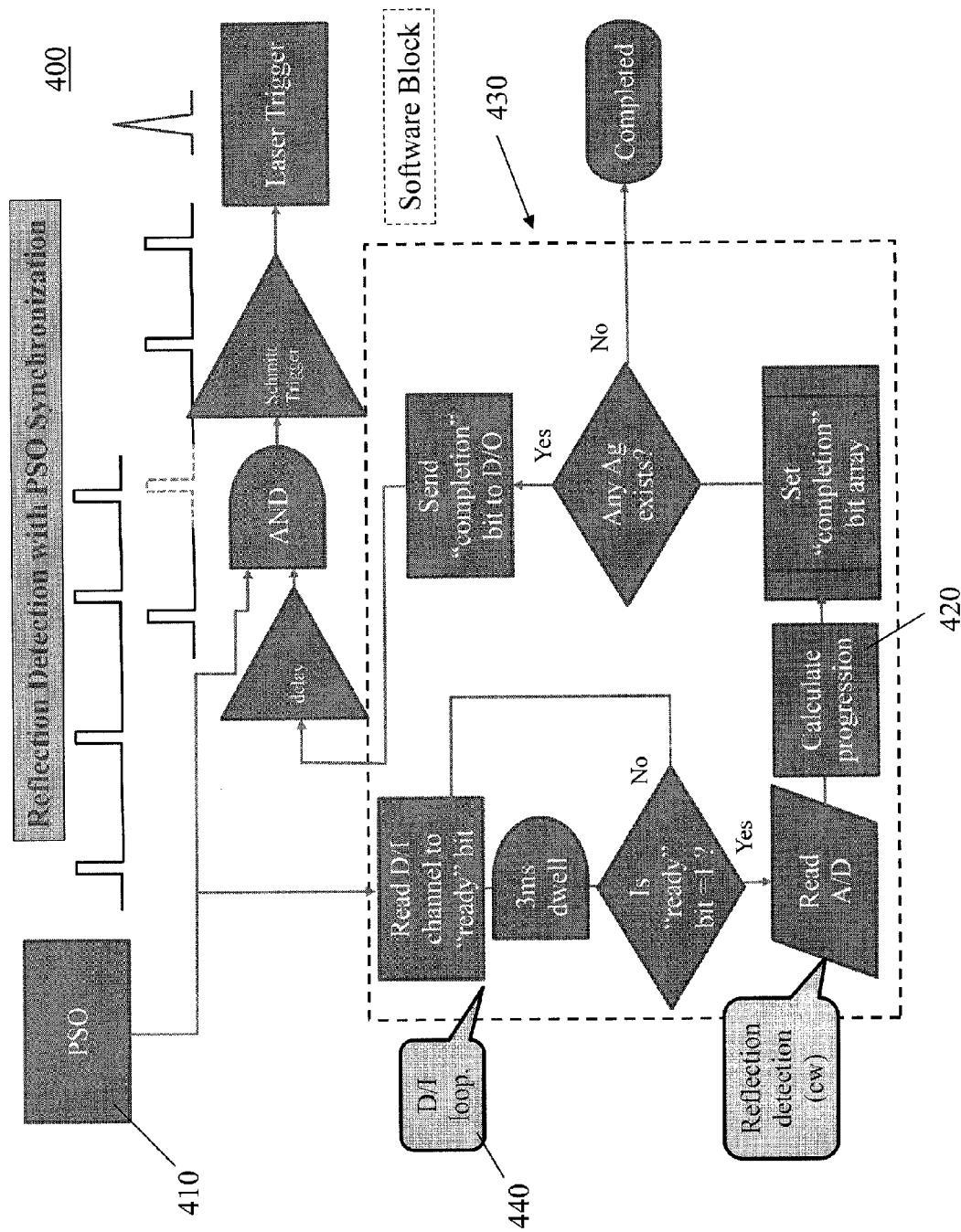
FIG. 4 shows a flow diagram of reflection detection with position-synchronized oscillator synchronization according to some embodiments of the present disclosure.

FIG. 4 shows an exemplary protocol (400) for reflection signal detection with PSO synchronization of reflected light (128) according to some embodiments of the present disclosure. The protocol (400) may have a PSO trigger (410). An "AND" gate and Schmitt trigger may decide whether to pass a certain trigger pulse and fire a laser beam pulse based on the output provided by the software block (430). The PSO trigger (410) may be monitored via a digital-input ("D/I") loop (440), for example, every 5 ms (e.g., 3 milliseconds dwell pulse; 2 milliseconds execution lapse), or other designated timing. The pulse provided by the PSO trigger (410) may have a long "on-time" (e.g., >10 milliseconds) so that the pulse will not be missed by the D/I loop (440). If the D/I loop (440) detects a trigger pulse, the reflection signals detected may be obtained by the collection lens (134), light detector (136) and/or CPU (150) shown in FIG. 1. When the strength of the detected reflection signals is lower than a pre-set value (e.g., 3 mV), the point of impact (124) that is being irradiated may be marked "first material-free" (e.g., "Ag-free") and the laser beam will not fire again at this location during the next revolution. When the protocol (400) loops back to its beginning, the number of, for example, "Ag-free" locations will be checked. If/when all locations are "Ag-free," protocol (400) may stop and removal of the layer of first material (104) will be deemed complete. In some embodiments, whether a location on the layer of first material (104) is "Ag-free" will be determined based on whether the protocol (400) has detected a change in the intensities of reflection signals being collected for that particular location. If not all locations are "first material-free," the protocol (400) will check if the next location is marked "first material-free" yet. If the next location has been determined to be "Ag-free," for example, the protocol (400) may pull down its output level to "low" for a time period longer than PSO pulse separation (e.g., 50 ms at 20 Hz) via a digital-output port. Low at one of the two inputs of an "AND" gate may block the next PSO trigger (410). Otherwise, the protocol (400) may remain normally "high" and allow further pulse of the laser beam (141). In some embodiments, a delay of about half of the PSO pulse separation (e.g., 25 ms at 20 Hz) before the "AND" gate may be used to minimize the likelihood of laser beam misfires.

Embodiments of the present disclosure may also perform optical end-point detection by detecting changes in surface morphology or texture. For example, the work piece (102) in FIG. 1 may be a medical catheter, wherein the layer of first material (104) is a polymer-only outer jacket and the layer of second material (106) is a braided metal shield enclosed within the outer jacket. The camera (160) may be used to continuously image and analyze the surface morphology or texture (e.g., the visibility of the metal braid shield) of the layer of first material (104) during ablation. A change in the morphology or texture detected during the ablation process may indicate that the laser beam (141) has penetrated through the polymer jacket at the point of impact (124) and is ablating the layer of a second material (106), namely the inner braid metal shield. This image data collected by the camera (160) may be transmitted to the image processor (164) and the CPU (150) for analysis and, thereafter, termination of the ablation process at the point of impact (124). Upon termination, the work piece (102) may be visually inspected (e.g., by the human eye and/or the camera (160)) to determine whether any portion of the layer of first material remains and whether laser ablation should be continued to remove more material. If more of the layer of first material (104) remains to be removed, laser ablation of this layer may be continued. In some embodiments, the decision to terminate ablation may be made based on various criteria, for example, when 90% of the image captured comprises the layer of first material (104) and 10% of the image captured comprises the layer of second material (106) or when 75% of the image captured comprises the layer of first material (104) and 25% of the image captured comprises the layer of second material (106). The surface morphology and/or texture end-point detection techniques of the present disclosure may be used to remove asymmetrical and/or symmetrical layers or known or unknown thickness from non-cylindrical and/or cylindrical multi-layer work pieces.

This process of end-point detection at the point of impact (124) of the laser beam based on imaging the surface morphology of the work piece (102) may be repeated until at least substantially all the layer of first material (104) and/or the layer of second material (106) is removed from the work piece (102). The process may be performed manually by an operator, automatically by a computer or semi-automatically by a computer with operation interaction, until the layer of first material (104) is at least substantially removed from the work piece (102). In some embodiments, the CPU (150) in conjunction with the camera (160) and image processor (164) may display an image of the ablation process and, in particular, the point of impact (124) on a display screen. In some embodiments, illumination provided by the ablating laser beam (141) may be sufficient to detect when the layer of first material (104) has been ablated at the point of impact (124) and/or when the layer of first material (104) has been substantially removed from the work piece (102). Illumination of the point of impact (124) by an ablating laser beam may be particularly acute when imaging contrast is enhanced by fluorescence observed in one or more materials. In some embodiments, the illumination source (190) may be used in varying amounts to obtain a desired level of discrimination or contrast between the layer of first material (104) and the layer of second material (106). In some embodiments, this contrast between the two layers may be improved by filtering.

Spectral Composition End-Point Detection. Some method and system embodiments of the present disclosure may perform end-point detection by detecting a change in the spectral composition of light being emitted from a layer of material during the ablation process. The term "spectral composition" as used herein may refer to the collection or composition of light emissions of varying wavelengths and light intensities within an emission spectrum that are characteristic of the material producing the light emissions. Unlike the optical end-point detection techniques described above, spectral emission techniques involve measuring, processing and/or otherwise analyzing the light that is emitted by the material as a consequence of it being illuminated by an external source of light. In this mechanism, external light has been absorbed by the material of a work piece, transformed by processes within it and is now re-emitted and carries characteristics of the chemical composition of that material. In spectral emission analysis according to the present invention, the outgoing light emissions do not have the same wavelengths as the illuminating or irradiating light source. For example, when the surface of a layer of material of a work piece is irradiated with and absorbs a laser beam of a certain wavelength, that material will emit light of one or more different wavelengths that are characteristic of the chemical composition of that material. Accordingly, the emitted light may be collected, composition of its wavelengths can be measured, processed and/or otherwise analyzed to determine what material produces light emissions having those wavelengths or, put differently, what material is associated with the specific spectral composition that has been detected. The emission of light may be the emission of plasma in the ablation plume, a fluorescent emission from the material under laser illumination or a combination of both. In some embodiments, the optical end-point detection techniques described above may be combined with the spectral composition techniques described below.

Spectral composition end-point detection may involve collecting, measuring, processing, and/or otherwise analyzing plasma plume emissions and/or fluorescent emissions. In some embodiments, using a laser beam to ablate the surface of a material may cause the formation of plasma from the surface material by atomizing and exciting the material (e.g., laser-induced breakdown spectroscopy). Because all atoms and molecules emit light of characteristic wavelengths when excited to sufficiently high temperatures, the chemical structure of a material being ablated by a laser beam can be determined by collecting, measuring, processing, and/or otherwise analyzing the wavelengths of light being emitted by the plasma and deriving a spectral composition value or characteristic based on those wavelengths. The plasma formation may be referred to as a "hot plasma plume" and the light emitted by the plasma plume may be referred to as an "ablation plume emission."

In some embodiments, the surface of a layer of material of a work piece may fluoresce upon being irradiated by a laser beam, referred to herein as laser-induced fluorescence, and emit a spectrum (i.e., wavelengths) of light that is characteristic of the material being illuminated and/or ablated. To emit fluorescence, a material may be excited from ground state by various means, including without limitation, optical excitations, electrical discharges and molecular collisions. Laser beams used in ablation often lay in the ultraviolet spectrum (e.g., wavelengths of 193 or 248 nm). The predominant fluorescence spectrum produced by single-photon excitation will have wavelengths longer than the ablating wavelength.

In some embodiments, the laser beam used for ablation may also be used to produce fluorescent emissions. However, a material need not be ablated in order to fluoresce—a laser beam may be absorbed by a material and cause fluorescence, although that laser beam may not be of sufficient intensity to exceed the ablation threshold of the material. In other embodiments, an illumination source may be used to cause fluorescent emissions. Upon being excited by a laser beam, the surface of a layer of material may de-excite and emit light, or fluoresce, usually at a wavelength greater than the wavelength of the laser beam. The chemical structure of the material being ablated may be determined by collecting, measuring, processing, and/or otherwise analyzing the spectral composition of the fluorescent emissions, namely the wavelengths, emitted from the material being ablated. Detecting a change in the spectral composition of the fluorescent emissions during laser ablation may indicate that a new layer of material is being irradiated and possibly ablated and that the ablation process should be modified or terminated.

Figure 5:
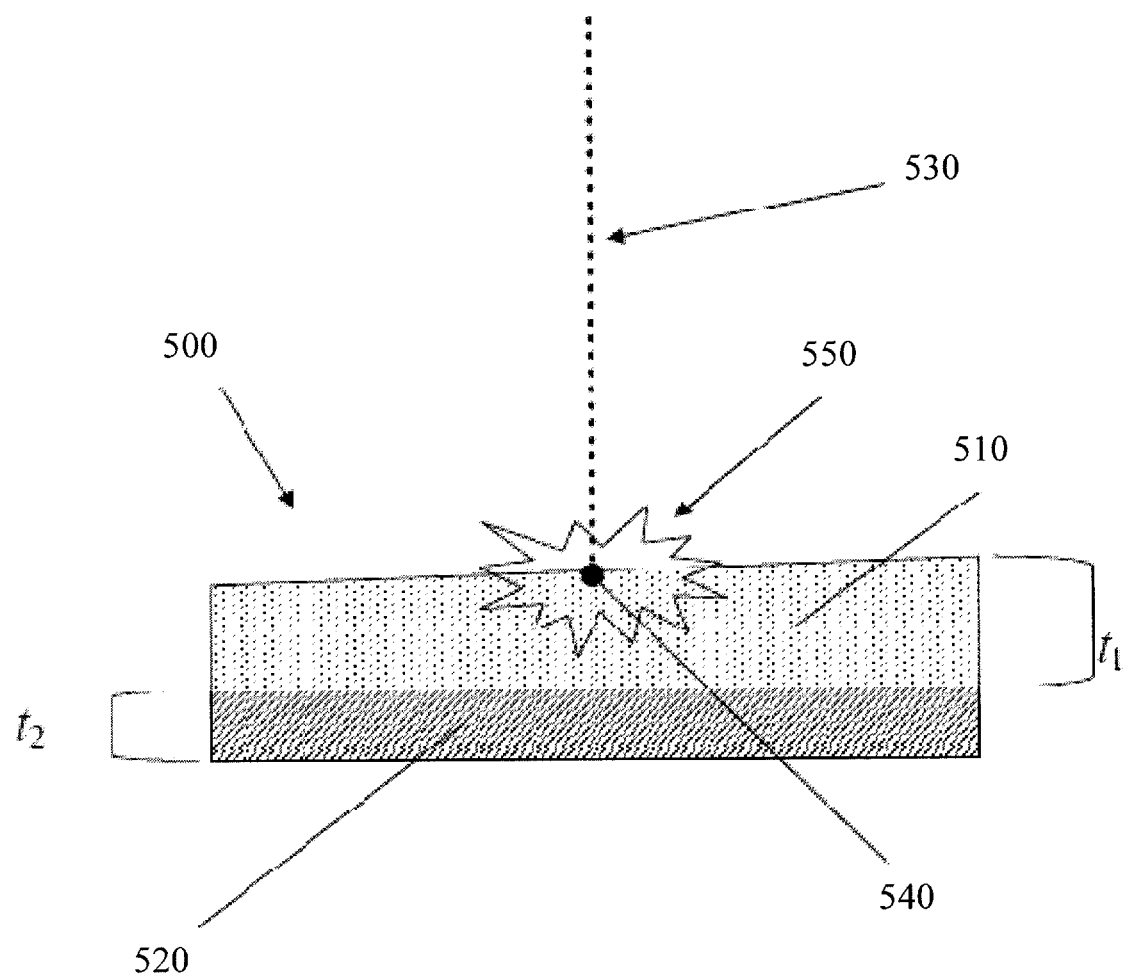
FIG. 5 shows an elevation view of a cross-section of a non-cylindrical work piece having a layer of a first material of non-uniform and unknown thickness positioned on top of a second material and radiating ablation plume emissions and/or material fluorescence according to some embodiments of the present disclosure.

FIG. 5 shows an elevation view of a cross-section of a non-cylindrical exemplary work piece (500) having a layer of first material (510) and a layer of second material (520). The layer of first material (510) may have a thickness, $t_1$, which is non-uniform. In some embodiments, the thickness, $t_1$ may also be unknown. The layer of second material (520) may have a thickness, $t_2$. In some embodiments, thickness, $t_2$, may be non-uniform and/or unknown. A laser beam (530) may irradiate the layer of first material (510) at a point of impact (140). This irradiation of the first material (510) may cause ablation plume emissions and/or fluorescent emissions (550) at the point of impact (540), as shown in FIG. 5. The spectral composition of the ablation plume emissions and/or fluorescent emissions (550) may be analyzed to determine the chemical structure of the layer of first material (510) being ablated. In some embodiments, the chemical structure (and thus the characteristics of the spectral composition) of the first material (510) and/or the second material (520) may be known or measured before the laser ablation process begins. The spectral composition detected during the ablation process should remain relatively constant because the chemical structure of the first material (510) should be substantially homogeneous throughout.

When the laser beam (530) begins ablating the layer of second material (520) having a different chemical structure than the first material (510), the composition of the emission spectrum of the ablation plume and/or the fluorescence will change to a composition that is characteristic of the second material (520). Detecting this change may indicate that the laser beam (530) is no longer ablating the first material (510) and, instead, is ablating the layer of second material (520). At this point, the ablation process may either be terminated or the laser beam (530) may be moved to a different position on the layer of first material (510). If the process is terminated, the work piece may be visually examined (e.g., by the human eye and/or an image-capture device) to determine whether any portion of the layer of first material (510) remains and whether laser ablation should be continued to remove more material. If more of the first material (510) remains to be removed, laser ablation of the first material (510) may continue. This process of end-point detection at the point of impact (540) of the laser beam (530) based on the spectral composition detected may be repeated until at least substantially the entire layer of first material (510) is removed from the work piece (500). The process may be performed manually by an operator, automatically by a computer or semi-automatically by a computer with operator assistance.

In some embodiments, the laser ablation process may be stopped when the spectral composition falls below a pre-set value (or a pre-set fraction of its original value at the beginning of the ablation process) or when the spectral composition increases and surpasses a pre-set value, thereby indicating that the layer of first material (510) has been fully ablated at the point of impact (540) and the laser beam (530) is currently ablating the layer of second material (520).

The value or characteristics of the spectral composition may be detected using one or more sensors and/or other instruments capable of collecting, measuring, processing, and/or otherwise analyzing ablation plasma emissions and/or fluorescent emissions emanating from the work piece (500). Some embodiments may include one or more filters to improve discrimination and/or signal-to-noise characteristics. In some embodiments, such sensors may be used in conjunction with a computer to process the light emitted from the work piece (500), which may include measuring the wavelengths of light emissions and comparing those wavelengths with a pre-set value or detecting a change in the wavelengths. Instrumentation and computers may also be employed to calibrate the intensity of the spectral composition relative to the total volume of first material (510) present in the work piece (500). The degree of completion of ablation of the first material (510) may be maximized and the degree of damage to the layer of second material (520) may be minimized by monitoring the spectral composition of light being emitted from the work piece (500), in conjunction with controlling the ablation rate based on laser beam parameters, such as wavelength, pulse duration and beam fluence. In some embodiments, forecasting or prediction algorithms may be included that extrapolate the progression of ablation, for example to predict when a pre-set value will be achieved, may also be used to minimize over-ablation.

Figure 6:
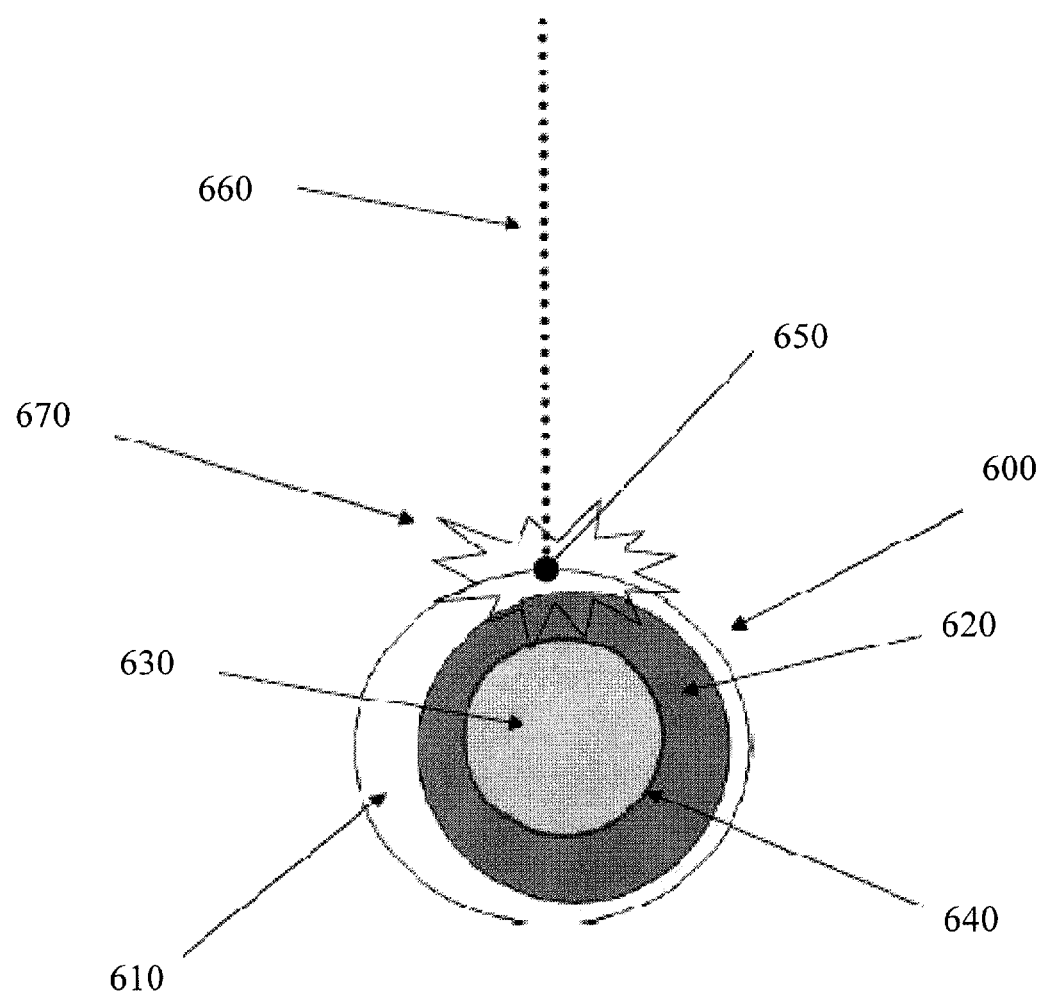
FIG. 6 shows a cross-sectional view of a cylindrical work piece having a layer of a first material of asymmetrical and unknown thickness positioned on top of a second material according to some embodiments of the present disclosure.

FIG. 6 shows a cross-sectional view of a cylindrical exemplary multi-layer work piece (600) having a layer of first material (610), a layer of second material (620) and a core wire (630) with a coating (640). The layer of first material (610) and the layer of second material (620) may each have thicknesses that are non-uniform, as shown in FIG. 6. In some embodiments, the thickness of the layer of first material (610) and/or second material (620) may be unknown. Using spectral composition end-point detection according to some embodiments, the layer of first material (610) may be substantially removed using laser ablation without substantially ablating the layer of second material (620). The layer of first material (610) may be irradiated by laser beam (660) to produce ablation plume emissions and/or fluorescent emissions (670) emanating from the point of impact (650) that are characteristic of the chemical structure of the layer of first material (610). When the laser beam (660) begins irradiating the layer of second material (620), the wavelengths of the ablation plasma emissions and/or fluorescent emissions will change and thus provide for a different spectral composition, which is characteristic of the chemical structure of the layer of second material (620), rather than the first material (610). Detecting this change in spectral composition may indicate that the laser beam (630) is no longer ablating the first material (610) and, instead, is ablating the layer of second material (620). The layer of second material (620), if desired, may be removed from the coating (640) of the core wire (630) in a similar manner.

For example, in some embodiments, the layer of first material (610) could be a polymer mixed with silver and the layer of second material (620) could be a polymer without silver, such that the first and second materials fluoresce differently and can be distinguished by this difference in fluorescent emission characteristics. In some embodiments, the core wire (630) and/or coating (640) may be metal materials that do not fluoresce upon being irradiated by the laser beam (660), such the disappearance of fluorescence may serve to indicate that the layer of second material (620) has been ablated at least at the point of impact (650).

While FIGS. 5 and 6 describe embodiments in terms of multi-layer work pieces that have thicknesses which are non-uniform or asymmetrical, the methods, systems and devices of the present disclosure may also be used on layers that have uniform or symmetrical thicknesses. As explained above, the thicknesses may also be known or unknown, according to some embodiments.

Figure 7:
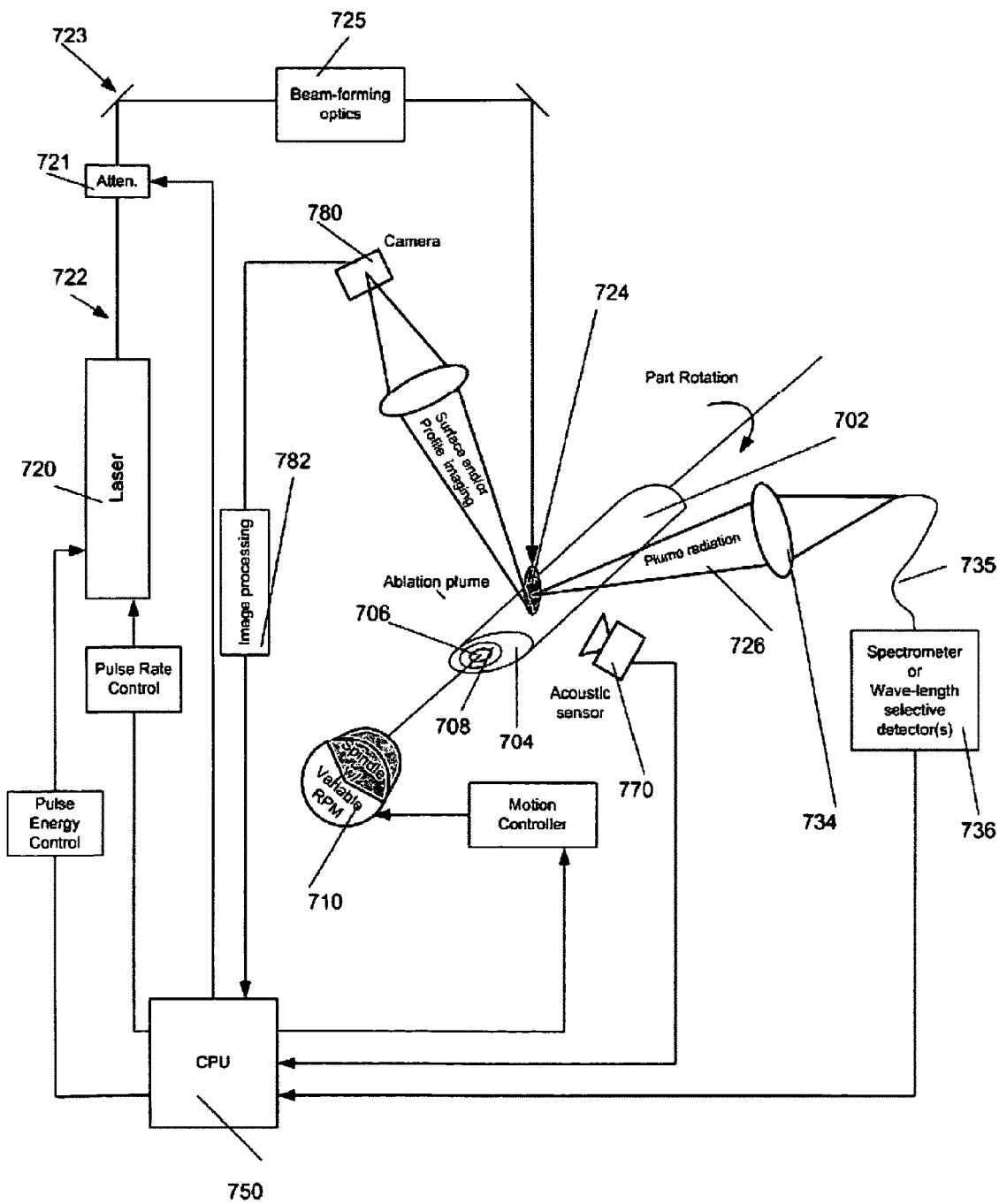
FIG. 7 shows an embodiment of a system for removing one or more layers of material from a multi-layer work piece using end-point detection methods according to some embodiments of the present disclosure.

FIG. 7 shows an example system (700) configured for precisely removing one or more layers of material using laser ablation from a cylindrical multi-layer work piece (702) using spectral composition end-point detection. Exemplary system (700) for detecting the end-point of the ablation of a layer of first material (704) (e.g., a polymer-metal coating) and/or a layer of second material (706) (e.g., a polymer-only coating) of the multi-layer work piece (702). The work piece (702) may be any shape or size, but in FIG. 7, for purposes of illustration and description only, the work piece (702) is a cylindrical piece (e.g., a multi-layer wire) with the layer of first material (704) being asymmetrical and the layer of second material (706) being substantially symmetrical. In other embodiments, the layer of first material (704) may be symmetrical and/or the layer of second material (706) may be asymmetrical. The work piece (702) may also have a core (708) (e.g., a metal wire) upon which the layer of second material (706) is positioned. In some embodiments, the thickness of the layer of first material (704) and/or the layer of second material (706) may be unknown. The work piece (702) may be coupled to a spindle (710) in communication with a motion controller (712) and rotated at fixed and/or variable speeds. A laser (720) producing a laser beam (722), propagates through various components, including (for example) an attenuator (721), one or more beam-forming optics (725) and one or more mirrors (727) before irradiating the work piece (702) at a point of impact (724). Beam-forming optics (725) may include without limitation a folding mirror and/or a dichroic mirror, as shown for example in FIGS. 1 and 17.

In some embodiments, the irradiation of the laser beam (722) upon the layer of first material (704) causes ablation plume emissions (726) to be radiated from the work piece (702) at the point of impact (724). The irradiation of laser beam (722) upon the layer of first material (704) may cause fluorescent emissions to radiate from the work piece (702). An illumination source (see, e.g., 190 in FIG. 1) may be provided to illuminate the work piece (702) at the point of impact (724) to make the work piece (702) visible for purposes of beam alignment to the work piece (702) features or to monitor optical characteristics of the work piece (e.g., reflectivity) for the purposes of end-point detection.

The system (700) may further include, for example, any or all of a wavelength selective filter (see 1718 in FIG. 17) and a collection lens (734) coupled to a light detector (736) (e.g., a light sensor, spectrometer or wavelength selective detector) via an optical fiber (735). The light detector (736) may be used to collect spectral emission data from the ablation plume emissions (726) and/or fluorescent emissions and transmit that data to a central processing unit ("CPU") (750) for processing and analyzing. In some embodiments, fluorescent emissions (728) may be collected by the collection lens (734) coupled to the light detector (736). The light detector (736) may collect spectral data from the fluorescent emissions (728) and transmit that data to the CPU (750) for processing and analyzing.

The CPU (750), having computer instructions operating (or operable) thereon, may be used to measure, process and/or otherwise analyze the spectral emission data and/or fluorescent emission data and output a value of the spectral composition of the layer of first material (704). Any reference to a "CPU" processor and/or the like in the present disclosure may include computer instructions operable/operating thereon to accomplish the disclosed functionality thereof (e.g., measuring, processing and/or otherwise analyzing information/data, and determining/computing and/or otherwise generating certain results). The filter (see 1718 in FIG. 17), collection lens (734), light detector (736) and/or CPU (750) may collectively and continually monitor the value of the spectral composition. When the value of the spectral composition changes, the CPU (750) can detect this change, recognize this as the end-point of the laser ablation at least at the point of impact (724) and terminate the ablation process with respect to that particular location on the layer of first material (704).

The work piece (702) may be rotated about the spindle (710) and/or the laser beam (722) may be moved along the length of the work piece (702) while the wavelength selective filter (see 1718 in FIG. 17), collection lens (734), light detector (736) and/or CPU (750) are monitoring spectral composition to precisely remove substantially all the layer of first material (704) without ablating or damaging the asymmetrical layer of second material (706). The rotation of the work piece (702) and the firing sequence of the laser beam (722) pulses may be asynchronous or synchronous. For example, in asynchronous embodiments, the spindle (710) may be rotated at a fixed speed of two revolutions per second, while the firing sequence of the laser beam (722) is completely independent of the rotation speed of the spindle (710). However, the pulse repetition rate should be set close to a multiple of rotation rate to minimize angular discrepancy between ablation locations and detection locations. In synchronous embodiments, the spindle (710) may be rotated, for example, at a fixed speed of two revolutions per second and the firing sequence of the laser beam (722) may be synchronized with a position-synchronized output ("PSO") function that delivers one trigger pulse for every angular increment that the spindle (710) rotates through.

Figure 8:
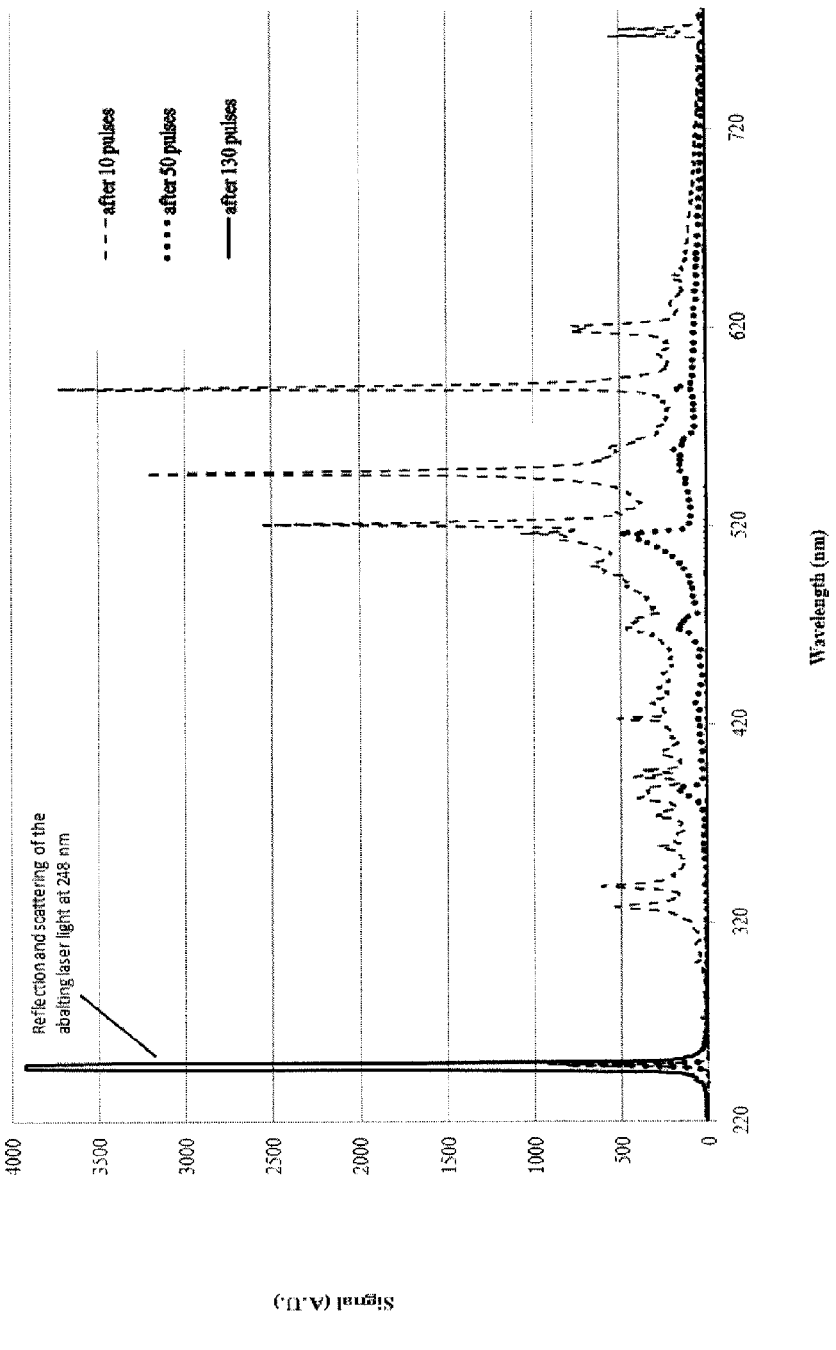
FIG. 8 shows sample data of the progression of spectra detected during ablation of layers of a multi-layer work piece according to some embodiments of the present disclosure.

FIG. 8 shows an example progression of the spectrum detected in the ablation region by the light detector (736), in this example a spectrometer, during the ablation process of the first layer of material (704). The legend in FIG. 8 denotes the pulse counts during ablation. In this example, a narrow-band attenuator for 248 nm was inserted before the spectrometer to reduce the overwhelming influx of 248-nm ablating laser radiation. For example, a high-reflection mirror coated at 248-nm may be used to reject about 99% of the 248-nm beam. Otherwise, the signal at 248 nm would saturate the spectrometer at nearby wavelengths and affect its spectral sensitivity and resolution. With that said, there may still be significant 248-nm laser radiation reaching the spectrometer by means of scattering or reflection even with the attenuator in place.

Figure 9:
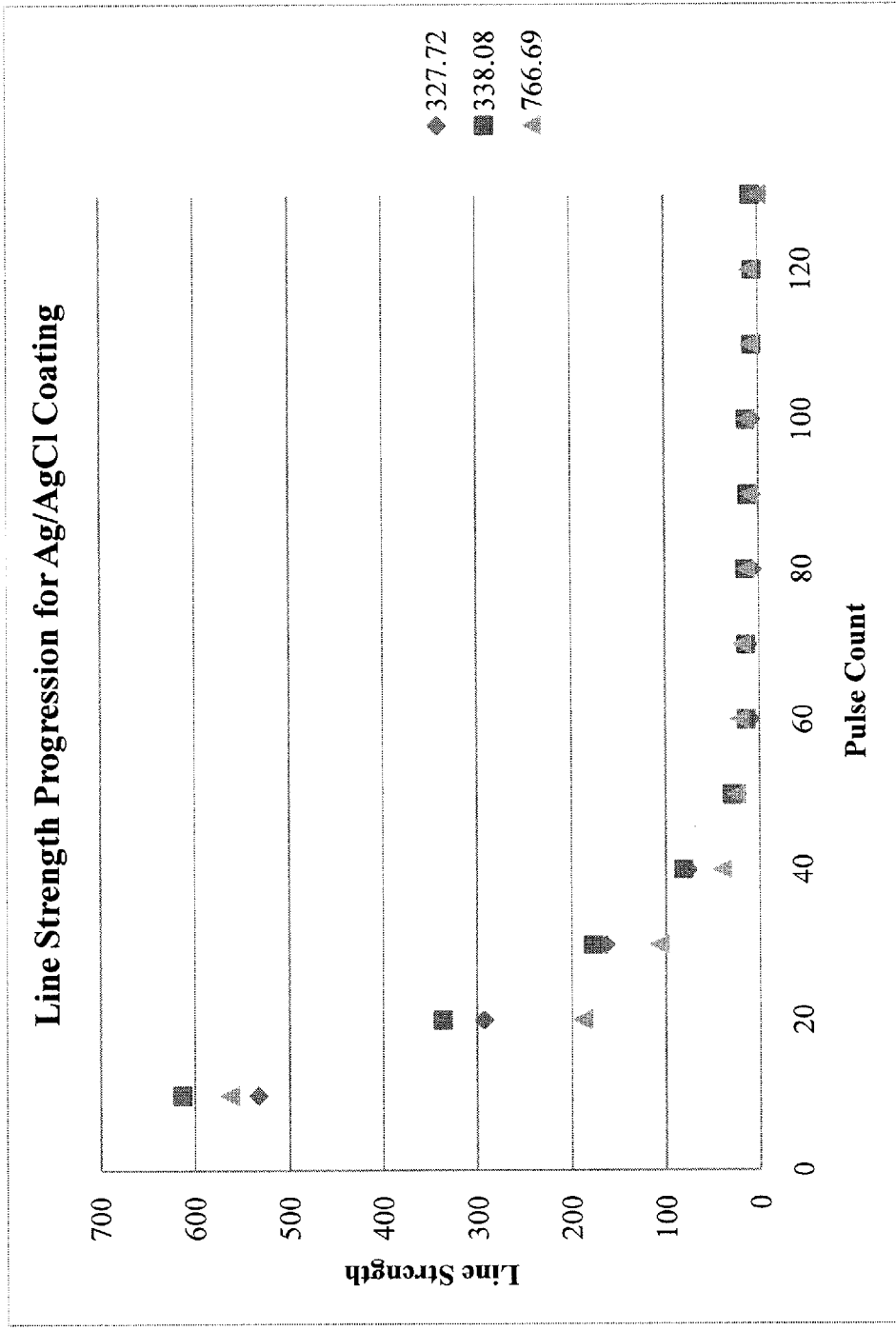
FIG. 9 shows sample data relating to the spectral emission strength progression for a layer of first material of the multi-layer work piece referred to in FIG. 8 according to some embodiments of the present disclosure.
Figure 10:
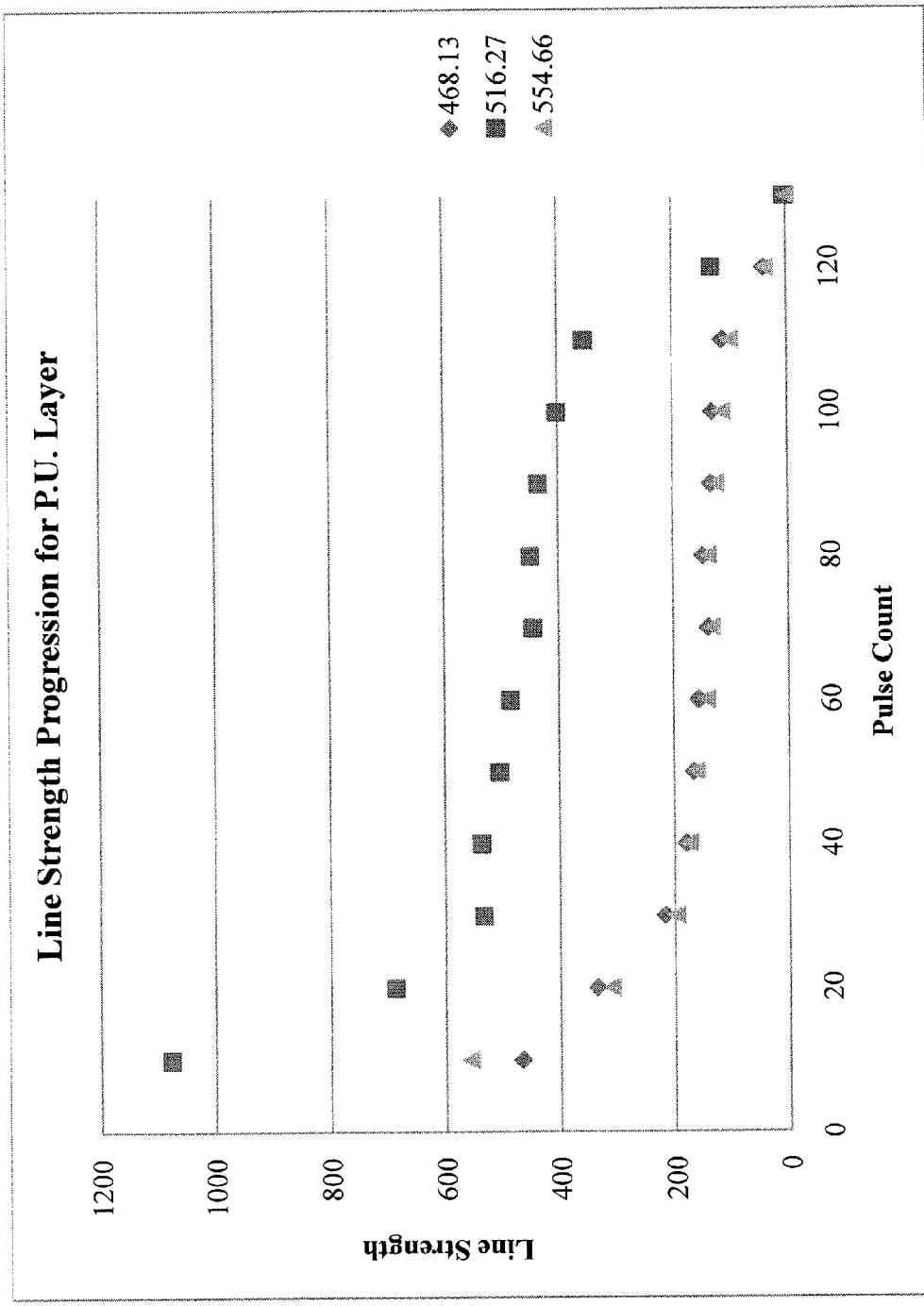
FIG. 10 shows sample data relating to the spectral emission strength progression for a layer of second material of the multi-layer work piece referred to in FIG. 8 according to some embodiments of the present disclosure.
Figure 11:
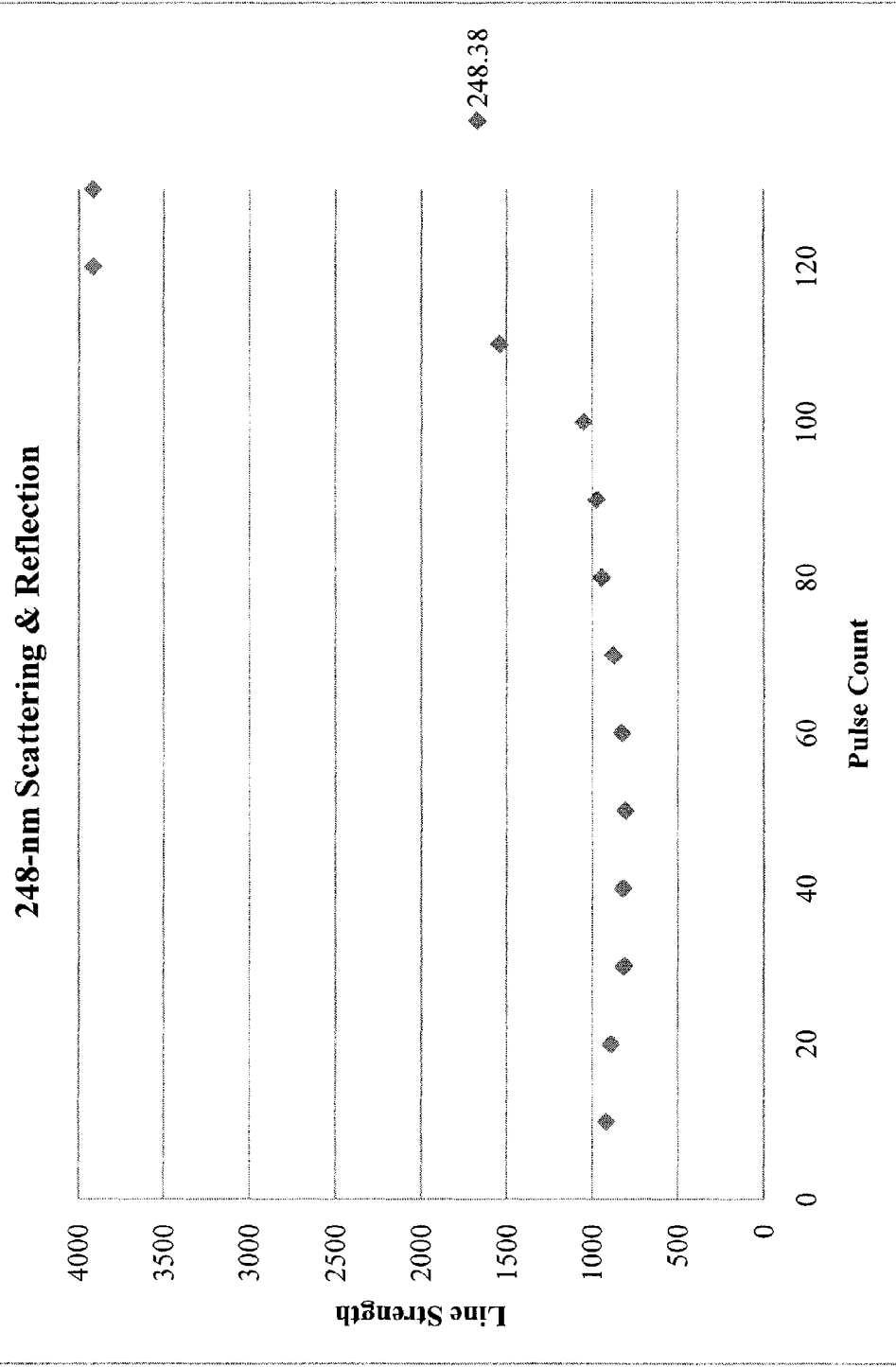
FIG. 11 shows sample data relating to the spectral emission strength progression for a core portion of the multi-layer work piece referred to in FIG. 8 according to some embodiments of the present disclosure.

FIGS. 9-11 illustrate an exemplary spectral emission strength progression for each of the layer of first material (704) (e.g., Ag/AgCl), the layer of second material (706) (e.g., a polyurethane material) and the core (708) (e.g., metal wire) of work piece (702), respectively, with reference to FIG. 8. The distinct spectral lines around 335 nm and 767 nm, as shown in FIG. 8, are determined to be exclusively first material (704) spectral emissions. The strength of these emissions decline to zero when the layer of first material (704) is totally ablated at, for example, around 60 pulses, as shown in FIG. 9. The broad feature around 450 nm to 650 nm, as shown in FIG. 8, belongs to the layer of second material (706) and the strength of these emissions declines to zero when the layer of second material (706) is totally ablated at around 130 pulses exposing the metal surface, as shown in FIG. 10. (see FIG. 8) On the other hand, the 248 nm signal strength reaches its maximum when both the layer of first material (704) and the layer of second material (706) are removed and the core (708) is totally exposed because the laser beam (722) is strongly reflected and scattered by the metal surface of the core (708), as shown in FIG. 11.

Figure 12:
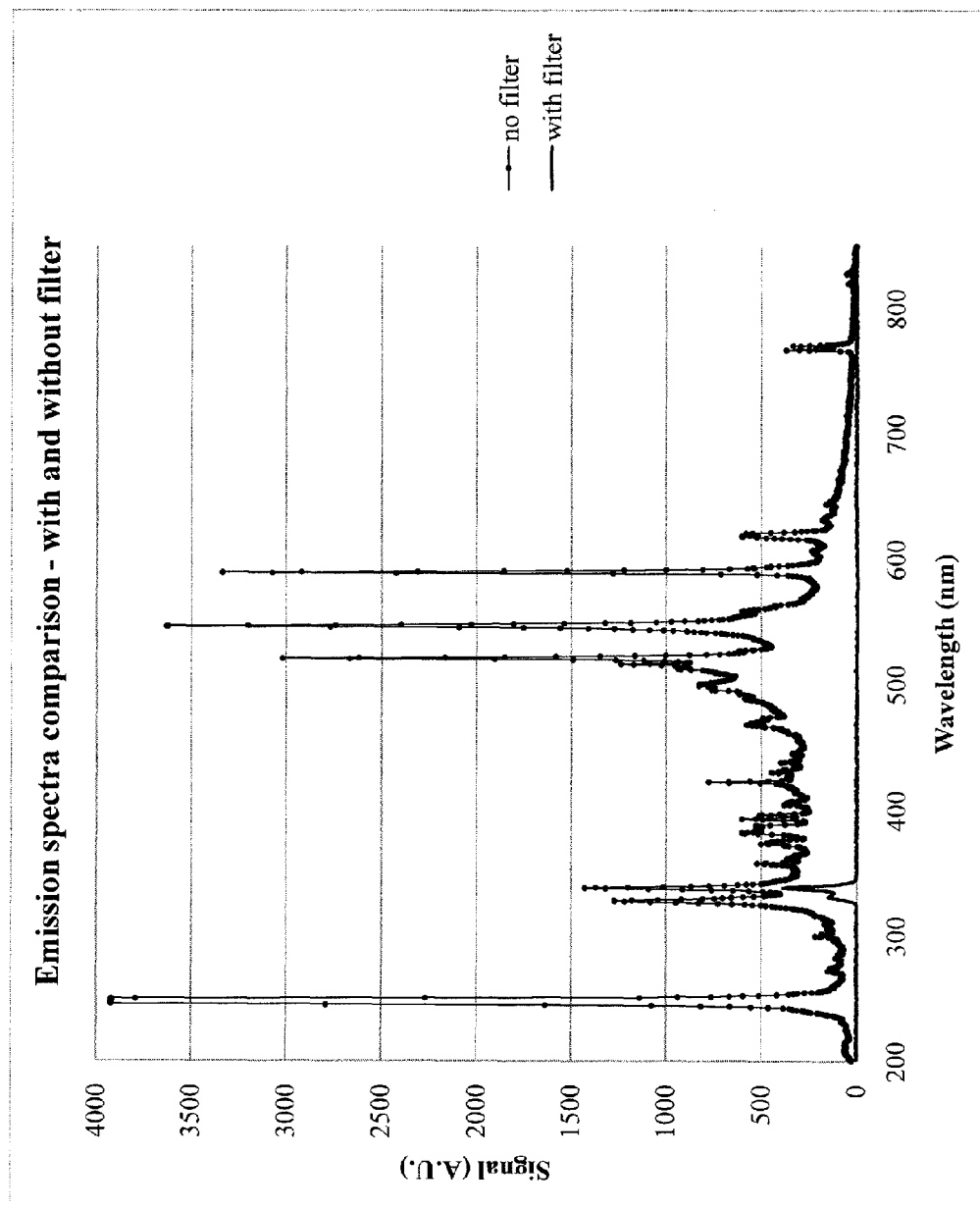
FIG. 12 shows sample data relating to optical filtering of spectral lines during ablation of the multi-layer work piece referred to in FIG. 8 according to some embodiments of the present disclosure.
Figure 13:
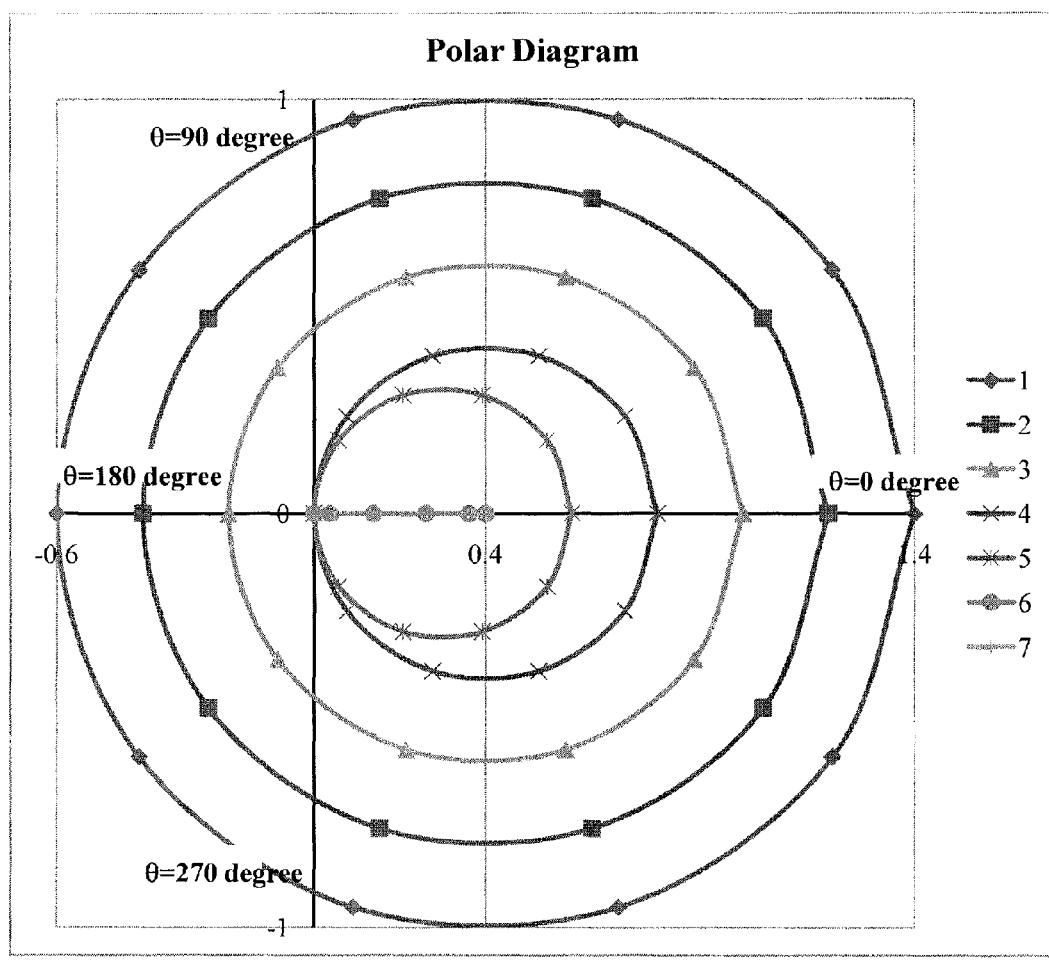
FIG. 13 shows a polar diagram illustrating laser ablation signals according to some embodiments of the present disclosure.

In some embodiments, a spectrometer may be used to monitor various spectral line strengths to determine the end points in the ablation. A passive narrow-pass-band optical filter may also be used to selectively detect specific spectral line signal strengths, e.g., at around 335 nm. By way of example, FIG. 12 illustrates an optical filter bypassing the spectral lines for the layer of first material (702) but suppressing all other spectral features. In some embodiments, the filtered emission signal may be monitored by a photo sensor, such as a photodiode. The absence of the filtered emission signal then will indicate the ablation end-point. FIG. 13 shows a polar diagram that simulates by example how this technique may work for a wire coated with non-uniform layers and how it may determine the end-point of ablation. For illustration purposes only, the section with thickest coating is oriented at zero degree in FIG. 13. The legend in FIG. 13 denotes the number of revolutions that the cylindrical part is rotated during ablation. The distance from origin (0,0) is proportional to the strength of the filtered emission signal. At the end of fourth revolution, the thinnest area at 180 degrees reached the end point because the fluorescence drops below 0.3%, and the laser stopped firing at this orientation during the remaining revolutions. At the end of sixth revolution, all but the thickest area at 0 degrees reached the end point. During the last revolution, the laser fires at the zero-degree orientation until the end-point is reached at this orientation. The entire process is complete after all orientations are deemed of reaching the end point.

Figure 14:
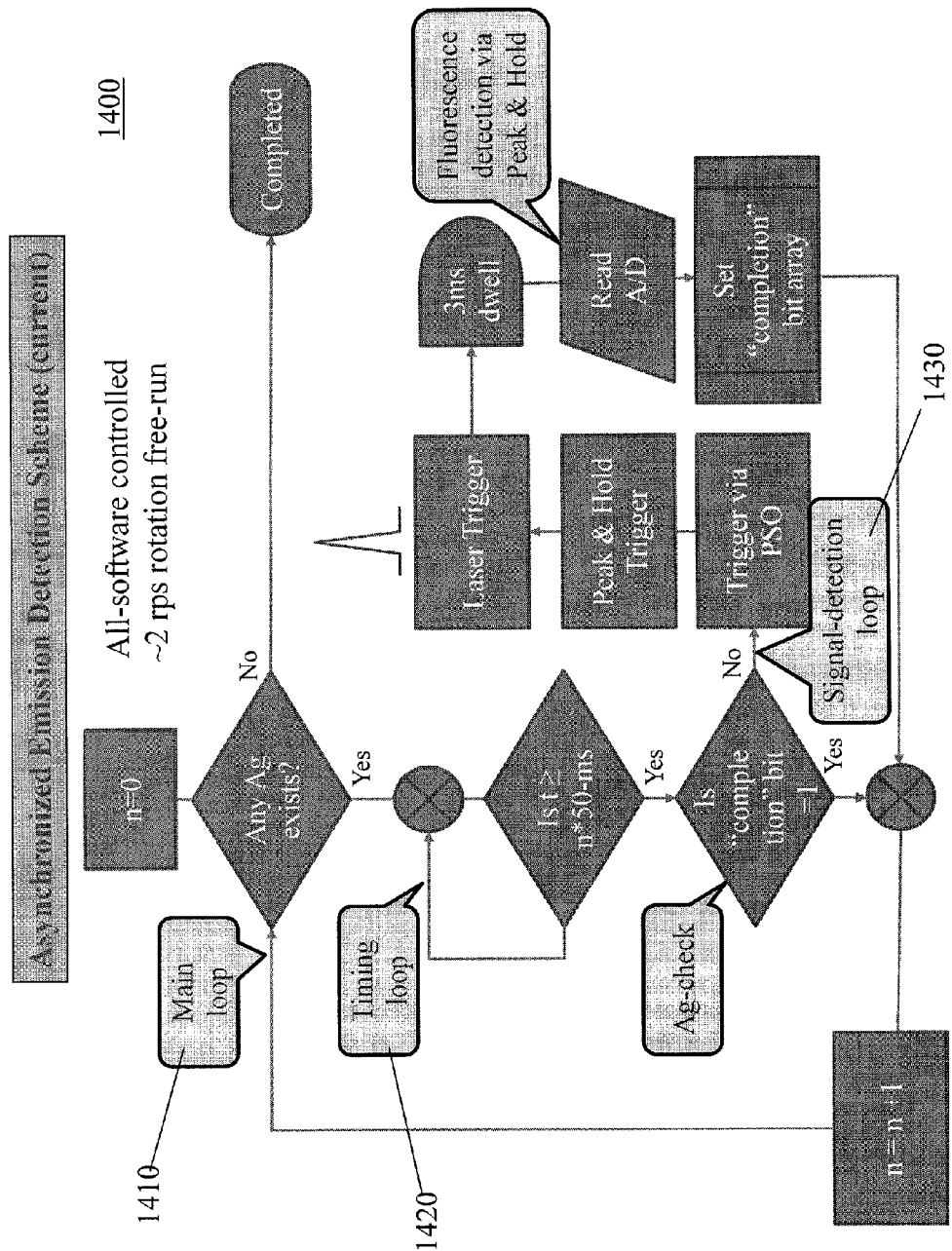
FIG. 14 shows a flow diagram of an asynchronous emission detection scheme according to some embodiments of the present disclosure.

The collection, measuring, processing, and/or otherwise analyzing data relating to ablation plume emissions (726) and/or fluorescent emissions within system (700) may be performed, at least in part, by one or more software programs running on the CPU (750). Such programs may include a plurality of nested loops. FIG. 14 shows an exemplary protocol (1400) for asynchronous emission detection of ablation plume emissions (726) according to some embodiments of the present disclosure. The protocol (1400) may have a main loop (1410) that executes, for example, every 50 milliseconds ("ms"), or other designated amount. The protocol (1400) may also include a timing loop (1420) to compare a time stamp against, for example, an integer multiplier of 50 ms, wherein the protocol (1400) may progress to a signal detection loop (1430) only after an additional 50 ms has lapsed since the timing loop (1420) was last executed. The signal detection loop (1430) may direct the protocol (1400) to return to the beginning of the main loop (1410) if the current location being ablated on the layer of first material (see 704 in FIG. 7) was previously marked "first material-free." For example, as shown in FIG. 14, if the first material is silver (Ag), the current location could be marked "Ag-Free." Otherwise, the protocol (1400) would execute the signal detection loop (1430) to collect, measure, process, and/or otherwise analyze the ablation plume emissions being radiated by the ablation.

The signal detection loop (1430) may fire one laser beam pulse and detect the ablation plume emission (see 726 in FIG. 7), for example, via the wavelength selective filter (see FIG. 17), collection lens (734), light detector (736) and/or CPU (750) shown in FIG. 7. The protocol (1400) may also include a peak-and-hold circuit and analog-to-digital converter that contribute to the processing and analysis of ablation plume emissions (and/or material fluorescence) data. In some embodiments, when the strength of the detected signal of the ablation plume emission is lower than a pre-set value (e.g., 3 mV), the current location on the layer of first material (see 704 in FIG. 7) that is being irradiated will be marked "first material-free" (e.g., "Ag-free") and the laser beam will not fire again at this location. When the protocol (1400) loops back to the beginning of the main loop (1410), the number of, for example, "Ag-free" locations will be checked. If/when all locations are "Ag-free," protocol (1400) may stop and removal of the layer of first material (see 704 in FIG. 7) will be deemed complete. In some embodiments, whether a location on the layer of first material (see 704 in FIG. 7) is "Ag-free" will be determined based on whether the protocol (1400) has detected a change in the ablation plume emissions for that particular location.

Figure 15:
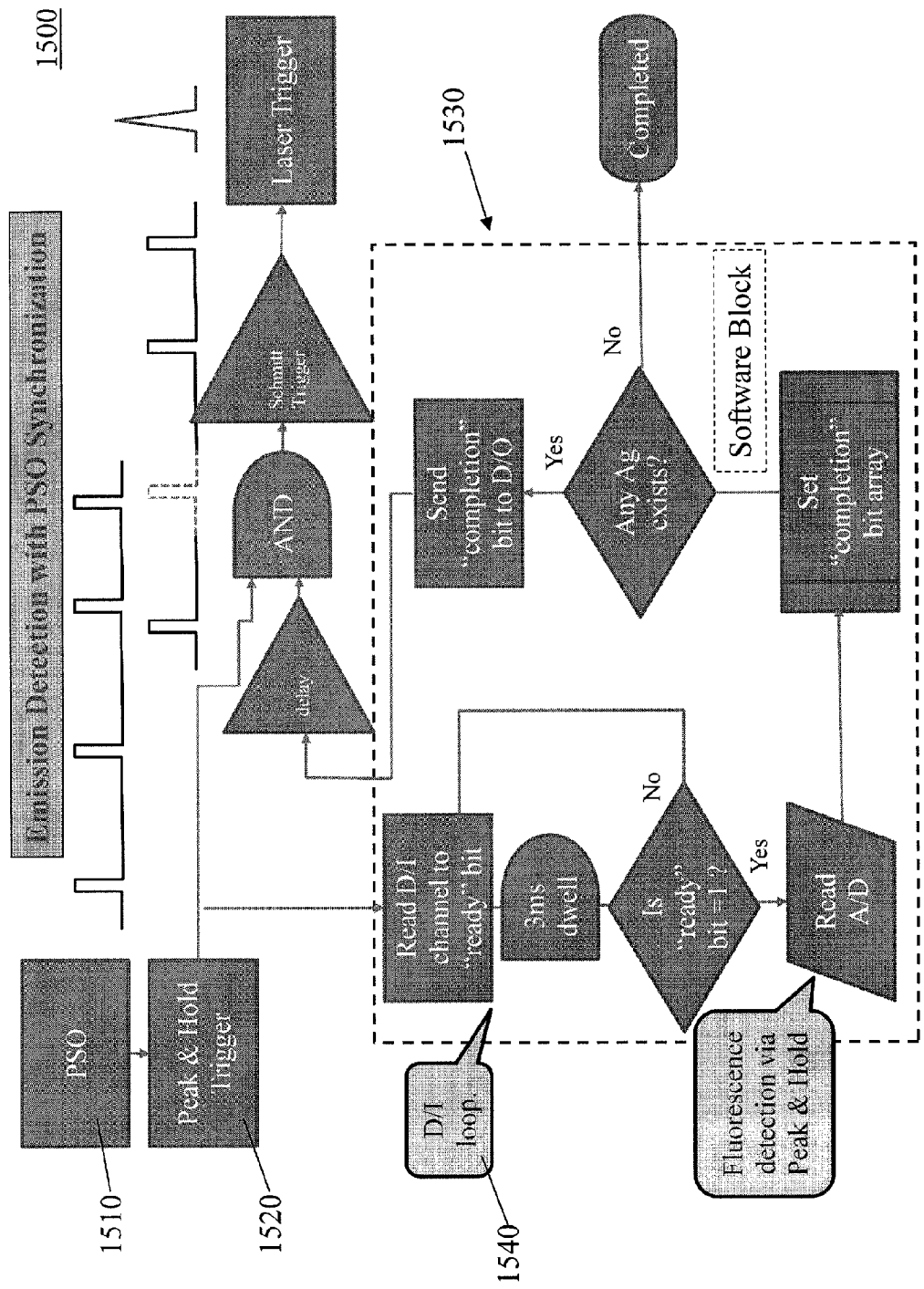
FIG. 15 shows a flow diagram of emission detection with position-synchronized oscillator synchronization according to some embodiments of the present disclosure.

FIG. 15 shows an exemplary protocol (1500) for ablation plume emission detection with PSO synchronization of ablation plume emissions (726) according to some embodiments of the present disclosure. The protocol (1500) may have a PSO trigger (1510). In some embodiments, a peak-and-hold circuit (1520) is triggered at an earlier time than the laser pulse at every PSO trigger (1510). Furthermore, as shown in FIG. 15, an "AND" gate and Schmitt trigger may decide whether to pass a certain trigger pulse and fire the laser based on the output provided by the software block (1530). The PSO trigger (1510) may be monitored via a digital-input ("D/I") loop (1540), for example, every 5 ms (e.g., 3 milliseconds dwell pulse; 2 milliseconds execution lapse). The pulse provided by the PSO trigger (1510) may have a long "on-time" (e.g., >10 milliseconds) so that the pulse will not be missed by the D/I loop (1540). If the D/I loop (1540) detects a trigger pulse, the signal detected from the ablation plume emission (and/or material fluorescence) may be obtained by a wavelength selective filter (see FIG. 17), collection lens (734), light detector (736) and/or CPU (750) shown in FIG. 7. The protocol (1500) may also include a peak-and-hold circuit and analog-to-digital converter that contribute to the processing and analysis of ablation plume emissions (and/or material fluorescence) data.

When the strength of the detected signal of the ablation plume emission (and/or material fluorescence) is lower than a pre-set value (e.g., 3 mV), the current location on the layer of first material (see 704 in FIG. 7) that is being irradiated may be marked "first material-free" (e.g., "Ag-free") and the laser beam will not fire again at this location during the next revolution. When the protocol (1500) loops back to its beginning, the number of, for example, "Ag-free" locations will be checked. If/when all locations are "Ag-free," protocol (1500) may stop and removal of the layer of first material (see 704 in FIG. 7) will be deemed complete. In some embodiments, whether a location on the layer of first material (see 704 in FIG. 7) is "Ag-free" will be determined based on whether the protocol (1500) has detected a change in the spectral composition for that particular location. If not all locations are "first material-free," the program will check if the next location is marked "first material-free" yet. If the next location has been determined to be "Ag-free," for example, the protocol (1500) may pull down its output level to "low" for a time period longer than PSO pulse separation (e.g., 50 ms at 20 Hz) via a digital-output port. Low at one of the two inputs of an "AND" gate may block the next PSO trigger. Otherwise, the protocol (1500) may remain normally "high" and allow further pulse of the laser beam (722). In some embodiments, a delay of about half of the PSO pulse separation (e.g., 25 ms at 20 Hz) before the "AND" gate may be used to minimize the likelihood of laser beam misfires.

Acoustic Signature End-Point Detection. Embodiments of the present disclosure may also perform end-point detection by detecting changes in the acoustic signature radiated by materials during the ablation process. More specifically, using a laser beam to ablate the surface of a material may cause the material to become excited and emit detectable acoustic excitations or signals into the surrounding media (e.g., air) as a result of extremely fast expansion of the material being ablated from the surface of the material. The excitations emitted by one material are characteristic of that material's chemical and mechanical structure and, thus, will be different from those emitted by another material of a different chemical or mechanical structure. The unique acoustic excitations emitted by a particular material under ablation may be referred to as that material's "acoustic signature." To this end, and as explained further below, detecting a change in acoustic signature during laser ablation may indicate that a new layer of material in a work piece is being irradiated and possibly ablated and that the ablation process should be modified or terminated.

Figure 16:
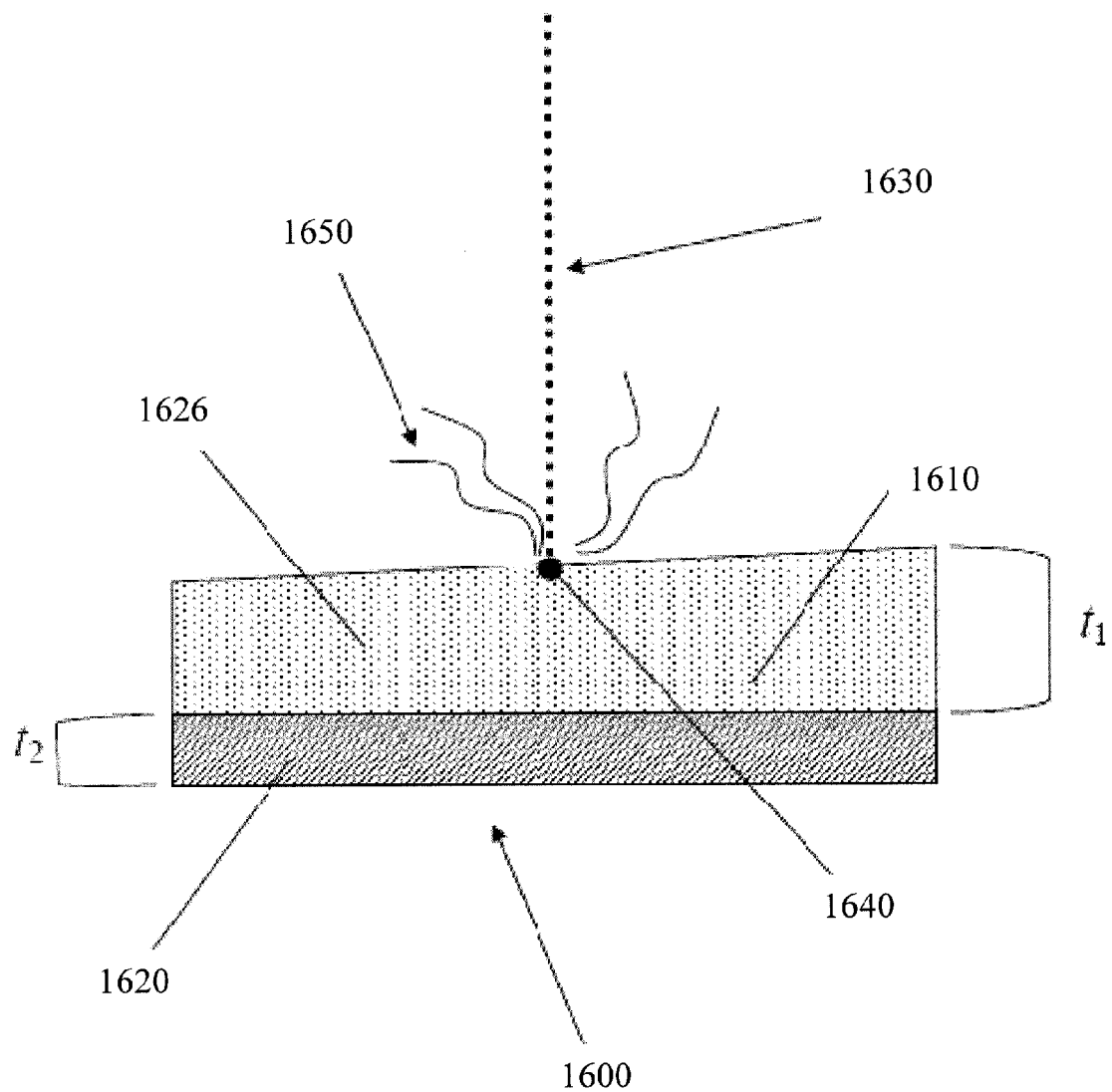
FIG. 16 shows an elevated view of a cross-section of a non-cylindrical work piece having a layer of first material of non-uniform and unknown thickness positioned adjacent to a second material and emitting acoustic excitations according to some embodiments of the present disclosure.

FIG. 16 shows an elevated view of a cross-section of a non-cylindrical, multi-layer work piece (1600) having a layer of first material (1610) and a layer of second material (1620). The layer of first material (1610) may have a thickness, $t_1$, which is non-uniform and/or unknown. The layer of second material (1620) may have a thickness, $t_2$, which is also non-uniform and/or unknown. A laser beam (1630) may irradiate the layer of first material (1610) at a point of impact (1640). Laser ablation of the first material (1610) may create detectable acoustic excitations (1650) that radiate into the surrounding media (e.g., air) at the point of impact (1640) as material is rapidly ablated from the work piece (1600). The acoustic excitations (1650) may be analyzed to identify the acoustic signature and, in turn, material that is currently being ablated by the laser beam. In some embodiments, the acoustic signature of each of the materials of the work piece (1600) may be known before the laser ablation process begins. The acoustic signature detected during the ablation process should remain relatively constant because the same material is being ablated. The acoustic signature being detected however will change when the laser beam (1630) stops irradiating the layer of first material (1610) and begins irradiating the layer of second material (1620), i.e., the acoustic signature being detected will be that which is associated with the second material (1620). Detecting this change may indicate that the laser beam (1630) is no longer ablating the layer of first material (1610) and, instead, is ablating the layer of second material (1620). At this point, the ablation process may either be terminated or the laser beam (1630) may be moved to a different position on the layer of first material (1610). If the process is terminated, the work piece (1600) may be visually examined (e.g., by the human eye and/or an image-capture device) to determine whether any portion of the layer of first material (1610) remains and whether laser ablation should be continued to remove more material. If more of the first material (1610) remains to be removed, laser ablation of the first material (1610) may be continued. This process of end-point detection at the point of impact (1640) of the laser beam (1630) based on acoustic signature may be repeated until at least substantially all the layer of first material (1610) is removed from the work piece (1600). The process may be performed manually by an operator, automatically by a computer or semi-automatically by a computer with operator assistance.

In some embodiments, the laser ablation process may be stopped when the detected value of the acoustic signature corresponding to the first material (1610) falls below a pre-set value (or a pre-set fraction of its original value at the beginning of the ablation process) or when the detected value of the acoustic signature of the second material (1620) increases and surpasses a pre-set value, thereby indicating that the layer of first material (1610) has been fully ablated at the point of impact (1640) and the laser beam (1630) is currently ablating the layer of second material (1620).

The value or characteristics of the acoustic signature may be detected, identified and measured using one or more sensors and/or other instruments capable of acoustic excitation detection and acoustic signature processing, such as an audio spectrum analyzer. In some embodiments, signal-to-noise ratio of acoustic signature detection may be enhanced by employing one or more methods including without limitation filtering, synchronous detection and/or background suppression. In some embodiments, these sensors and/or other detection instruments may be used in conjunction with a computer to detect acoustic excitations (1650), derive acoustic signatures and identify when the acoustic signature has changed. The degree of completion of ablation of the layer of first material (1610) may be maximized and any degree of ablation, damage or other alterations to the layer of second material (1620) may be minimized by monitoring the acoustic excitations (1650) being emitted at the point of impact (1640), in conjunction with controlling the ablation rate based on laser beam parameters, such as wavelength, pulse duration and fluence.

It should be noted that, while FIG. 16 depicts a non-cylindrical, multi-layer work piece with asymmetrical layers, the method and system embodiments employing the acoustic signature end-point detection techniques disclosed herein may be used to remove layers from cylindrical work pieces as well. Moreover, the layers on any work piece may have thicknesses that are asymmetrical or symmetrical and known or unknown.

The system (700) may also, or in the alternative, be used to precisely remove one or more selected layers of material via laser ablation from the work piece (702) using acoustic signature end-point detection. The system (700) may include an acoustic sensor (770) for detecting, collecting, measuring, processing, and/or otherwise analyzing acoustic excitations emitted from the work piece (702) as a result of the laser beam (722) irradiating and ablating the work piece (702) at the point of impact (724). The acoustic sensor (770) collects the acoustic excitations, measures, processes, and/or otherwise analyzes them and transmits acoustic excitation data to the CPU (750) for further processing and analyzing. The CPU (750) may be able to analyze the acoustic excitations and output a value of an ablating acoustic signature of the asymmetrical layer of first material (704). Accordingly, the acoustic sensor (770) and the CPU (750) may continually monitor the value of the acoustic signature of the acoustic excitations being emitted during ablation. When the acoustic signature changes, the CPU (750) may detect this change, recognize this as the end-point of the laser ablation at least at the point of impact (724) and terminate the ablation process. As with spectral composition end-point detection, the work piece (702) may be rotated about spindle (710) and the laser beam (722) may be moved along the length of the work piece (702) while the acoustic signature is being monitored to precisely remove substantially all the asymmetrical layer of first material (704) without ablating or damaging the asymmetrical layer of second material (706). The same process may be applied to precisely remove the asymmetrical layer of second material (706) without ablating or damaging the core wire (708), if desired.

The system (700) may also, or in the alternative, be used to precisely remove one or more selected layers of material via laser ablation from the work piece (702) using surface morphology end-point detection, as discussed above with reference to FIGS. 1-5. The system (700) may include an image-capture device (780) (e.g., a camera) for collecting, measuring, processing, and/or otherwise analyzing images of the morphology of the layer of first material (704). The image-capture device (780) may collect image data, measure, process, and/or otherwise analyze this data and transmit the data to an image processor (782) and/or the CPU (750) for further processing and analyzing. The image processor (782) and/or the CPU (750) may be able to analyze the images collected by the image-capture device (780) and output a graphical depiction of the image collected on a display screen (not shown) associated with the CPU (450). The graphical depiction will show an image of the point of impact (724) and allow a human operator and/or a computer to determine what layer of material is currently be irradiated and ablated.

Figure 17:
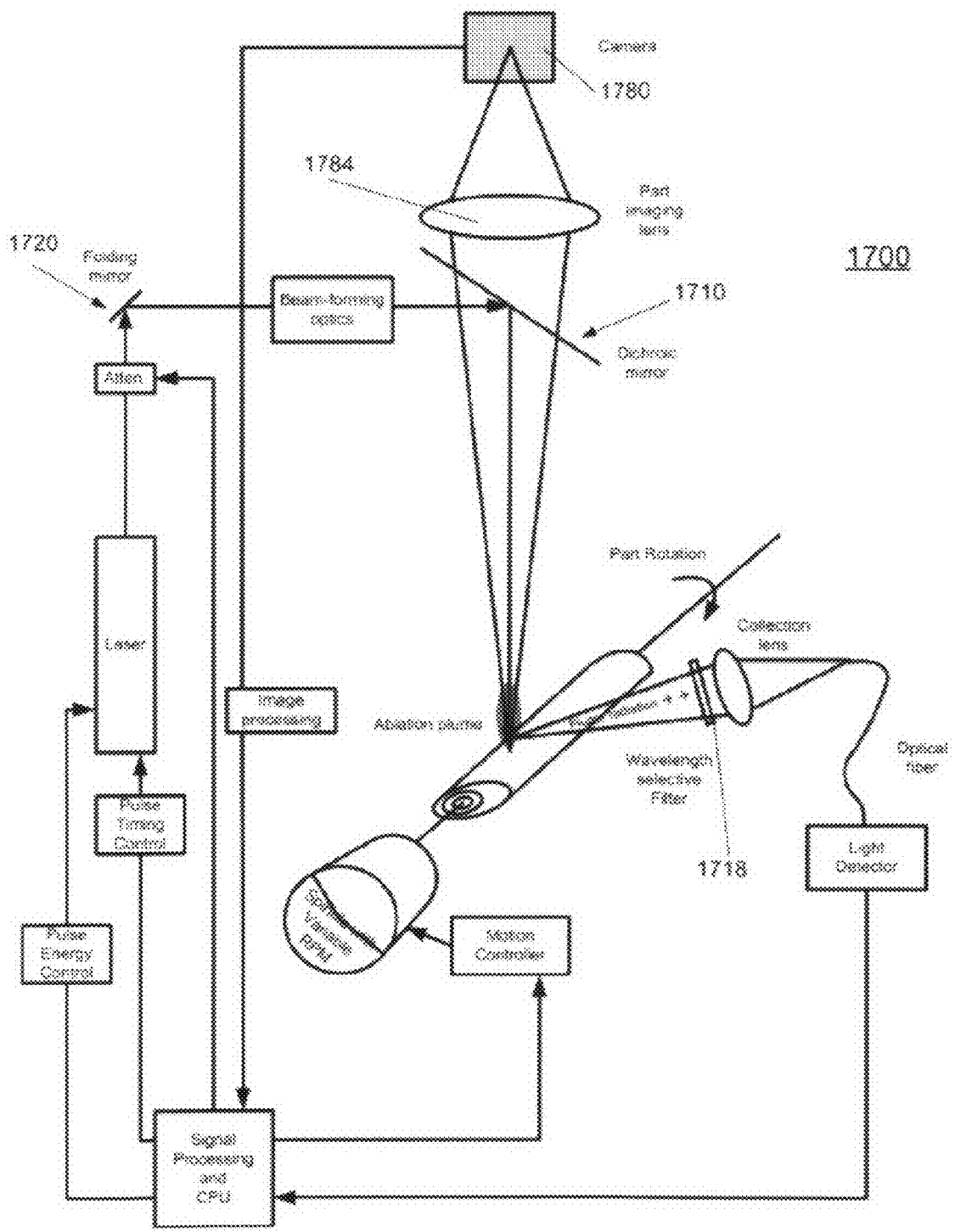
FIG. 17 shows another embodiment of a system for removing one or more layers of material from a multi-layer work piece using end-point detection methods according to the present disclosure.

The image-capture device (780), image processor (782) and/or the CPU (750) will continually image, process and display images of the point of impact (724). When the images show that the layer of second material (706) has become exposed, the CPU (750) and/or a human operator may recognize this as the end-point of the laser ablation at least at the point of impact (724) and terminate the ablation process. As with spectral composition and acoustic signature end-point detection, the work piece (702) may be rotated about spindle (710) and the laser beam (722) may be moved along the length of the work piece (702) while the morphology of the work piece at the point of impact (724) is being monitored to precisely remove substantially all the layer of first material (704) without ablating or damaging the asymmetrical layer of second material (706). The same process may be applied to precisely remove the asymmetrical layer of second material (706) without ablating or damaging the core wire (708), if desired. FIG. 17 shows an additional system embodiment configured with image-capture devices (1780) positioned behind beaming-forming optics (e.g., dichroic mirrors). In some embodiments, a part-imaging lens (1784) may also be included.

Pre-Processing Profile Mapping. Embodiments of the present disclosure may be directed to selectively and precisely removing one or more layers of material from a multi-layer work piece by performing pre-processing mapping of the profile of a work piece. Pre-processing mapping of the profile of a work piece may be accomplished using various methods for collecting, measuring, processing and/or otherwise analyzing specific thicknesses of a layer of material to be removed from the work piece. With reference to FIG. 7, for example, the image-capturing device (780) may be used to obtain an image of the work piece (702). The image-capturing device (780) may be configured to provide profile imaging of the work piece (702), such as the layer of first material (704). In some embodiments, the profile of the work piece (702) may be observed from several azimuthally-spaced directions. FIGS. 1 and 17, for example, illustrate alternative positioning of image-capturing devices. In some embodiments, the work piece (702) may be cylindrical, as shown in FIG. 7, and set into motion about the spindle (710) and monitored to detect mechanical dynamic disbalance and deduce layer asymmetry therefrom. In some embodiments, the image-capturing device (780) may be connected to the image-processing unit (782) and the CPU (750). In some embodiments, the CPU (750) may process and analyze image data obtained from the image-capturing device (780) relating to the work piece (702) and convert this data into dimension information. The dimension information may be presented in a table format, depicted on an image of the work piece (702) or both, and displayed on a display screen (not shown) to a human operator.

In addition to those illustrated in systems of FIGS. 1, 7 and 17, numerous other instruments may be used for monitoring and detecting numerous other characteristics of materials subjected to laser ablation. Embodiments of the present disclosure may include various means for monitoring characteristics of a layer of material and for detecting changes in those characteristics, including without limitation, magnetic and electromagnetic induction and eddy current; ultrasonic; x-ray fluorescence (XRF); thermal imaging to exploit differences in emissivity between layers; multi-spectral imaging to exploit differences in reflectivity between coatings in wavelength bands within or outside the visible band; differences in surface morphology (e.g., electrolytic coatings may be rough while polymer coatings may be relatively smooth, such that with appropriate illumination (perhaps grazing angle), this difference may be detected using photometric and/or radiometric techniques or by image analysis techniques); microwave detection (e.g., in case of outer conductive layer(s), microwave energy may be pumped down the center conductor such that it would nominally be shielded by an outer conductive layer (e.g., a coaxial cable) and once the outer coating was breached, this would allow microwave energy to leak out and the spatial distribution of the emitted microwaves may be detected as a function of angular position); capacitance methods (e.g., in case of outer conductive layer(s), if a conductor were placed parallel to a wire and a potential was applied between this conductor and the wire center conductor, it would form a variable capacitor, where the angular distribution of the conductive outer layer could be correlated to an angular change in capacitance as the sample wire is rotated); spectroscopic differences in the ablation plume emissions and/or material fluorescence; acoustical differences due to different shock wave formation in various materials; and distinct morphology, texture and/or structural features present in an underlying layer detectable only after removal of the outer layer (e.g., presence of a metal braid under polymer overcoat in a catheter).

Embodiments of the subject matter described herein may be realized in digital electronic components and circuitry, integrated circuitry, specially designed application specific integrated circuits ("ASICs"), computer hardware, firmware, software and/or combinations thereof. Embodiments of the subject matter described herein may be realized in optical, mechanical and analog and digital electronic components and circuitry. Embodiments of the present disclosure may include one or more computer programs that are executable and/or interpretable on a programmable system including at least one programmable processor, which may be special or general purpose, coupled to receive data and instructions from, and to transmit data and instructions to, a storage system, at least one input device and at least one output device.

To provide for interaction with a user, the subject matter described herein may be implemented on a computer having a display device, such as for example a cathode ray tube ("CRT") or a liquid crystal display ("LCD") monitor for displaying information to the user. The computer may also have a keyboard and/or pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback or tactile feedback. Similarly, input from the user to the computer may be received in any form, including but not limited to visual, auditory or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user may interact with an implementation of the subject matter described herein, or any combination of such back-end, middleware, or front-end components. The computing system can include clients and servers.

The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and sub-combinations of the disclosed features and/or combinations and sub-combinations of several further features disclosed above. Other embodiments may be within the scope of the appended claims.

What is claimed is:

1. A laser ablation method comprising:
    irradiating a first location on the surface of a workpiece having at least one layer of a first material of finite thickness with a series of laser pulses from a first laser source;
    ablating the first layer with the series of pulses at the at least one location;
    monitoring the presence of one or more characteristics of the ablated first material after each pulse such that the absence of the one or more characteristics can be determined; and
    identifying the completion of ablation of the layer of first material at the first location upon the determination of the presence of the one or more characteristics being lower than a threshold value.

2. The method of claim 1, further comprising terminating the ablating within one pulse period, upon identifying the completion of ablation of the layer of first material.

3. The method of claim 1, further comprising changing the first location to a second location in response to identifying the completion of ablation of the layer of first material at the first location.

4. The method of claim 1, wherein the work piece is cylindrical and the thickness of the layer of material is asymmetrical.

5. The method of claim 1, wherein the work piece is non-cylindrical and the thickness of the layer of material is non-uniform.

6. The method of claim 1, wherein the one or more characteristics are selected from the group consisting of: optical signature of the surface of the first location, ablation plume emissions, and fluorescence.

7. The method of claim 6, wherein:
    the one or more characteristics comprise ablation plume emissions;
    the ablation plume emissions comprise light emissions;
    the light emissions are filtered via an optical filter to admit only a spectral component of the light emissions that is characteristic of the layer of first material; and
    ablating is terminated within one pulse period upon identifying the absence of the spectral component.

8. The method of claim 6, wherein:
    the one or more characteristics comprise fluorescence;
    the fluorescence is filtered via an optical filter to admit only a spectral component of the fluorescence that is characteristic of the layer of first material; and
    ablating is terminated within one pulse period upon identifying the absence of the spectral component.

9. The method of claim 6, wherein:
    the one or more characteristics comprise and optical signature of the surface of the first location upon an illuminating beam of light being directed thereon;
    the light reflected from the surface is analyzed to determine an optical signature that is characteristic of the layer of first material, wherein
    ablating is terminated within one pulse period upon identifying the absence of the optical signature.

10. The method of claim 9, wherein the illuminating beam is the first laser source.

11. The method of claim 9, wherein the illuminating beam is a second beam from a second laser source.

12. A laser ablation system comprising:
    a first source of light comprising a laser light-emitting device for irradiating a first location on the surface of a multi-layer work piece with a series of laser pulses from a first laser beam;
    a detector configured for generating at least one signal after each pulse, the signal relating to one or more characteristics of the material ablated after each pulse corresponding to a first layer of the multi-layer work piece at the first location; and
    a processor having instructions operable thereon and configured to at least one of operate and control at least the laser light-emitting device,
    wherein the instructions additionally are configured to enable the processor to:
        analyze the at least one signal to monitor the presence of the one or more characteristics of the layer of first material such that the absence of the one or more characteristics can be determined; and
        identifying the completion of ablation of the layer of first material at the first location upon the determination of the one or more characteristics being below a threshold value.

13. The system of claim 12, wherein the instructions are further configured to enable the processor to terminate the delivery of pulses upon determining the absence of the one or more characteristics after a pulse.

14. The system of claim 12, wherein the instructions are further configured to enable the processor to terminate the delivery of pulses within a pulse period, upon determining the absence of the one or more characteristics after a pulse.

15. The system of claim 12, wherein the instructions are further configured to enable the processor to cause irradiation of a second location on the surface of the workpiece.

16. The system of claim 12, wherein the detector is selected from the group consisting of a light sensor such as photodiode or photon multiplier tube, and combination thereof.

17. The system of claim 12, further comprising a peak-and-hold circuit to allow pulsed signal detection.

18. The system of claim 12, wherein the one or more characteristics are light emissions selected from the group consisting of optical signature of the surface, ablation plume emissions, fluorescence.

19. The system of claim 18, further comprising a filter to pass only a spectral component of the light emission that is characteristic of the layer of first material.

20. The system according to claim 18, wherein the light emissions correspond to an optical signal of the surface, and wherein the system further comprises a second light source for producing the irradiating the surface at the first location to create the optical signal.

* * * * *